US010628848B2

(12) United States Patent
Wu et al.

(10) Patent No.: US 10,628,848 B2
(45) Date of Patent: Apr. 21, 2020

(54) ENTITY SPONSORSHIP WITHIN A MODULAR SEARCH OBJECT FRAMEWORK

(71) Applicant: Oath Inc., New York, NY (US)

(72) Inventors: Tingyi Wu, Sunnyvale, CA (US); Sophia Thitirat Perl, San Jose, CA (US); Enrique Andres Munoz Torres, Mountain View, CA (US); Andrew Poon, San Francisco, CA (US); Conrad Wai, San Francisco, CA (US)

(73) Assignee: Oath Inc., New York, NY (US)

( * ) Notice: Subject to any disclaimer, the term of this patent is extended or adjusted under 35 U.S.C. 154(b) by 1377 days.

(21) Appl. No.: 14/277,964

(22) Filed: May 15, 2014

(65) Prior Publication Data
US 2015/0332322 A1    Nov. 19, 2015

(51) Int. Cl.
G06Q 30/02    (2012.01)
G06F 16/28    (2019.01)
G06F 16/951    (2019.01)

(52) U.S. Cl.
CPC ....... *G06Q 30/0251* (2013.01); *G06F 16/288* (2019.01); *G06F 16/289* (2019.01); *G06F 16/951* (2019.01); *G06Q 30/0256* (2013.01); *G06Q 30/0267* (2013.01); *G06Q 30/0277* (2013.01)

(58) Field of Classification Search
USPC ........................................... 705/14.75, 14.54
See application file for complete search history.

(56) References Cited

U.S. PATENT DOCUMENTS

| | | | | |
|---|---|---|---|---|
| 2003/0006911 A1* | 1/2003 | Smith | ................... | G06Q 30/02 340/988 |
| 2009/0157507 A1* | 6/2009 | Agius | ................ | G06Q 30/0239 705/14.39 |
| 2010/0031185 A1* | 2/2010 | Wilson | .............. | G06F 17/30905 715/777 |
| 2012/0197857 A1* | 8/2012 | Huang | .................. | G06F 3/0488 707/706 |
| 2013/0085848 A1* | 4/2013 | Dyor | ...................... | G06Q 30/02 705/14.49 |
| 2013/0103712 A1* | 4/2013 | Li | ........................ | G06F 3/04883 707/769 |
| 2013/0117111 A1* | 5/2013 | Dyor | ..................... | G06F 3/0481 705/14.54 |

(Continued)

OTHER PUBLICATIONS

Trademark Electronic Search System (TESS), Wikipedia, Oct. 18, 2016, United States Patent and Trademark Office.*

(Continued)

*Primary Examiner* — Kiersten V Summers
(74) *Attorney, Agent, or Firm* — Cooper Legal Group, LLC

(57) ABSTRACT

A modular search object framework can provide modular search results including sponsored entity search results. The framework includes circuitry that outputs an interactive entity section based on an online search. The interactive section or at least parts of the section may be sponsored by one or more entities. The interactive section includes a plurality of moveable visual objects, such as cards that can be shuffled, flipped, or swiped around. The visual objects and features associated with the objects may be monetized.

20 Claims, 11 Drawing Sheets

(56) References Cited

U.S. PATENT DOCUMENTS

2014/0372218 A1* 12/2014 Talluri ............... G06Q 30/0256
 705/14.54
2015/0066973 A1* 3/2015 Kim ................. G06F 16/90335
 707/766
2015/0149429 A1* 5/2015 Chilakamarri .... G06F 17/30867
 707/706

OTHER PUBLICATIONS

Trademark Electronic Search System (TESS), Windows, Oct. 18, 2016, United States Patent and Trademark Office.*
Trademark Electronic Search System (TESS), Mac OS, Oct. 18, 2016, United States Patent and Trademark Office.*
Trademark Electronic Search System (TESS), UNIX, Oct. 18, 2016, United States Patent and Trademark Office.*
Trademark Electronic Search System (TESS), Linux, Oct. 18, 2016, United States Patent and Trademark Office.*
Trademark Electronic Search System (TESS), FREEBSD, Oct. 18, 2016, United States Patent and Trademark Office.*
Trademark Electronic Search System (TESS), IOS, Oct. 18, 2016, United States Patent and Trademark Office.*
Trademark Electronic Search System (TESS), Android, Oct. 18, 2016, United States Patent and Trademark Office.*
Trademark Electronic Search System (TESS), Facebook, Oct. 18, 2016, United States Patent and Trademark Office.*
Trademark Electronic Search System (TESS), Linkedin, Oct. 18, 2016, United States Patent and Trademark Office.*
Trademark Electronic Search System (TESS), Twitter, Oct. 18, 2016, United States Patent and Trademark Office.*
Trademark Electronic Search System (TESS), Flickr, Oct. 18, 2016, United States Patent and Trademark Office.*
Trademark Electronic Search System (TESS), Google+, Oct. 18, 2016, United States Patent and Trademark Office.*
Trademark Electronic Search System (TESS), Javascript, Oct. 18, 2016, United States Patent and Trademark Office.*
Trademark Electronic Search System (TESS), Tumblr, Oct. 18, 2016, United States Patent and Trademark Office.*
http://facebook.github.io/react/docs/tutorial.html, author unknown, 12 pgs., retrieved May 19, 2014.
http://facebook.github.io/react/docs/thinking-in-react.html, author unknown, 5 pgs., retrieved May 19, 2014.
http://facebook.github.io/react/docs/interactivity-and-dynamic-uis.html, author unknown, 3 pgs., retrieved May 19, 2014.
http://facebook.github.io/react/docs/multiple-components.html, author unknown, 4 pgs., retrieved May 19, 2014.
http://facebook.github.io/react/docs/reusable-components.html, author unknown, 4 pgs., retrieved May 19, 2014.
http://facebook.github.io/react/docs/forms.html, author unknown, 3 pgs., retrieved May 19, 2014.
http://facebook.github.io/react/docs/working-with-the-browser.html, author unknown, 3 pgs., retrieved May 19, 2014.
http://facebook.github.io/react/docs/addons.html, author unknown, 2 pgs., retrieved May 19, 2014.
http://en.wikipedia.org/wiki/Facebook_Paper, author unknown, 6pgs., retrieved May 19, 2014.

* cited by examiner

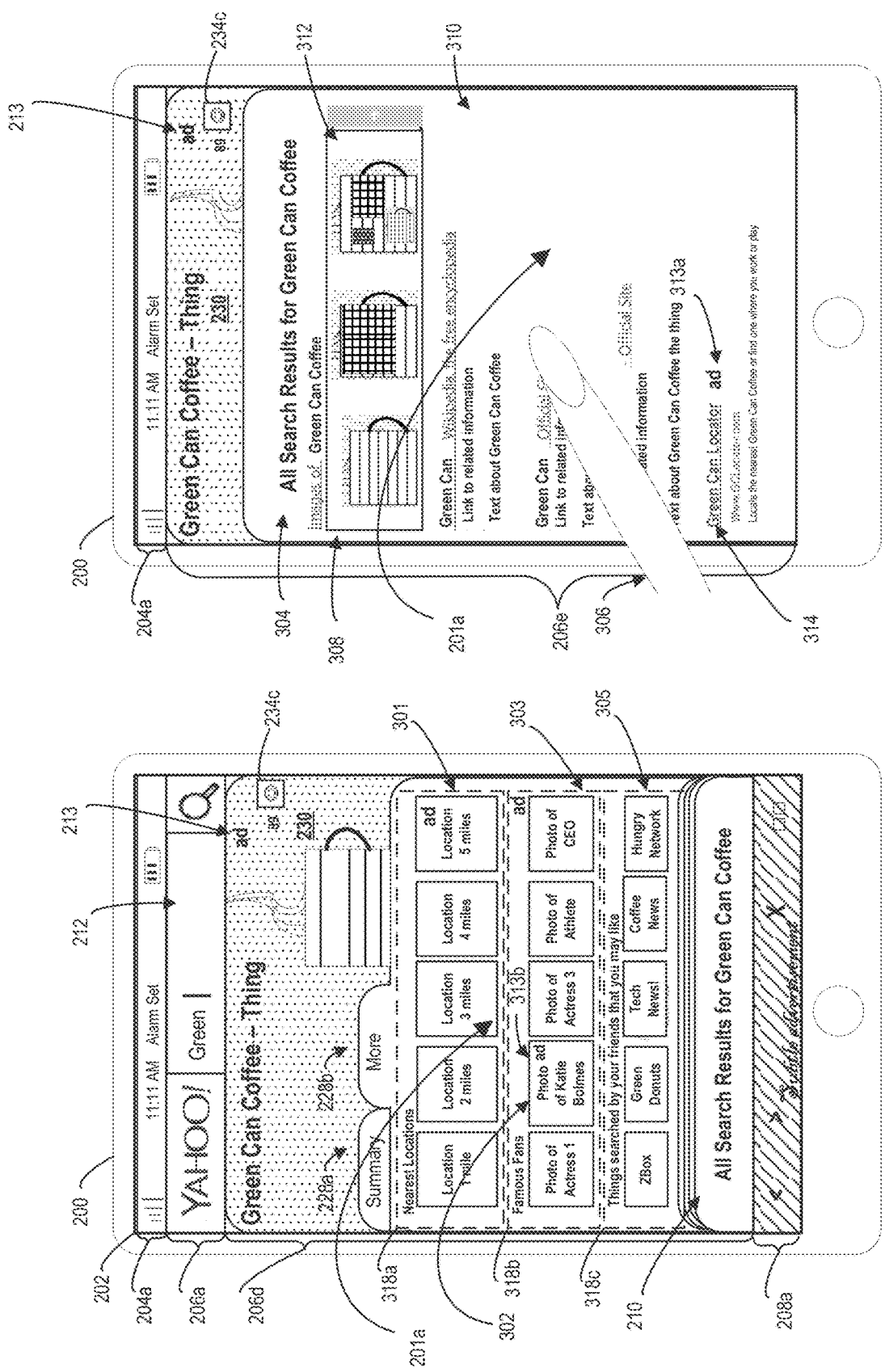

ENTITY SPONSORSHIP WITHIN A MODULAR SEARCH OBJECT FRAMEWORK

BACKGROUND

This application relates to sponsorship and monetization of entity based content (such as entity search results and graphical user interfaces). This application also relates to modular search objects and frameworks for supporting entity based content, modular search objects, and user interactions with the aforementioned.

It is common for users to enter a query consisting of one or more keywords and execute a search on a web page. Sponsored and non-sponsored search results may be provided on a results page that gives lists of links with titles and some description of the linked contents. In the sponsored search results, links are typically monetized.

Increasingly, users are executing searches on mobile devices, such as smartphones or tablets. The common technique of providing lists of results is not well adapted to the particular constraints of a mobile device. There is, therefore, a set of engineering problems to be solved in order to provide search results to users that are well adapted to mobile devices or mobile device interfaces to other devices (such as televisions). Also, the monetization of search results adapted to mobile devices or mobile device interfaces to other devices brings up technical problems to be solved as well. For example, conventional sponsored ads in the mobile context may be intrusive to the user experience.

BRIEF DESCRIPTION OF THE DRAWINGS

The systems and methods may be better understood with reference to the following drawings and description. Non-limiting and non-exhaustive examples are described with reference to the following drawings. The components in the drawings are not necessarily to scale; emphasis instead is being placed upon illustrating the principles of the system. In the drawings, like referenced numerals designate corresponding parts throughout the different views.

FIG. 3a illustrates the example displayed entity search result object of FIG. 2b. Specifically, this depiction of the displayed object includes multiple interactive sections rendered by respective circuitry of the modular search object framework. Some of the sections and objects within FIGS. 3a-6b are sponsored.

FIG. 3b illustrates the example displayed entity search result object of FIG. 2b overlapped by an example image based search results section and an example webpage based search results section rendered by respective circuitry of the modular search object framework.

FIG. 6b illustrates an example expanded and displayed sponsored entity search result object associated with a thing. Specifically, this depiction of the expanded object associated with a thing includes multiple interactive sections rendered by respective circuitry of the modular search object framework. Also, in this displayed entity search result object some particular parts are sponsored instead of the entity tray.

FIG. 8 illustrates an example of a client device, such as the audience client device 124 in FIG. 1; and FIG. 10 illustrates an example of a server, such as the modular search framework server 116.

DETAILED DESCRIPTION

Figure 1:
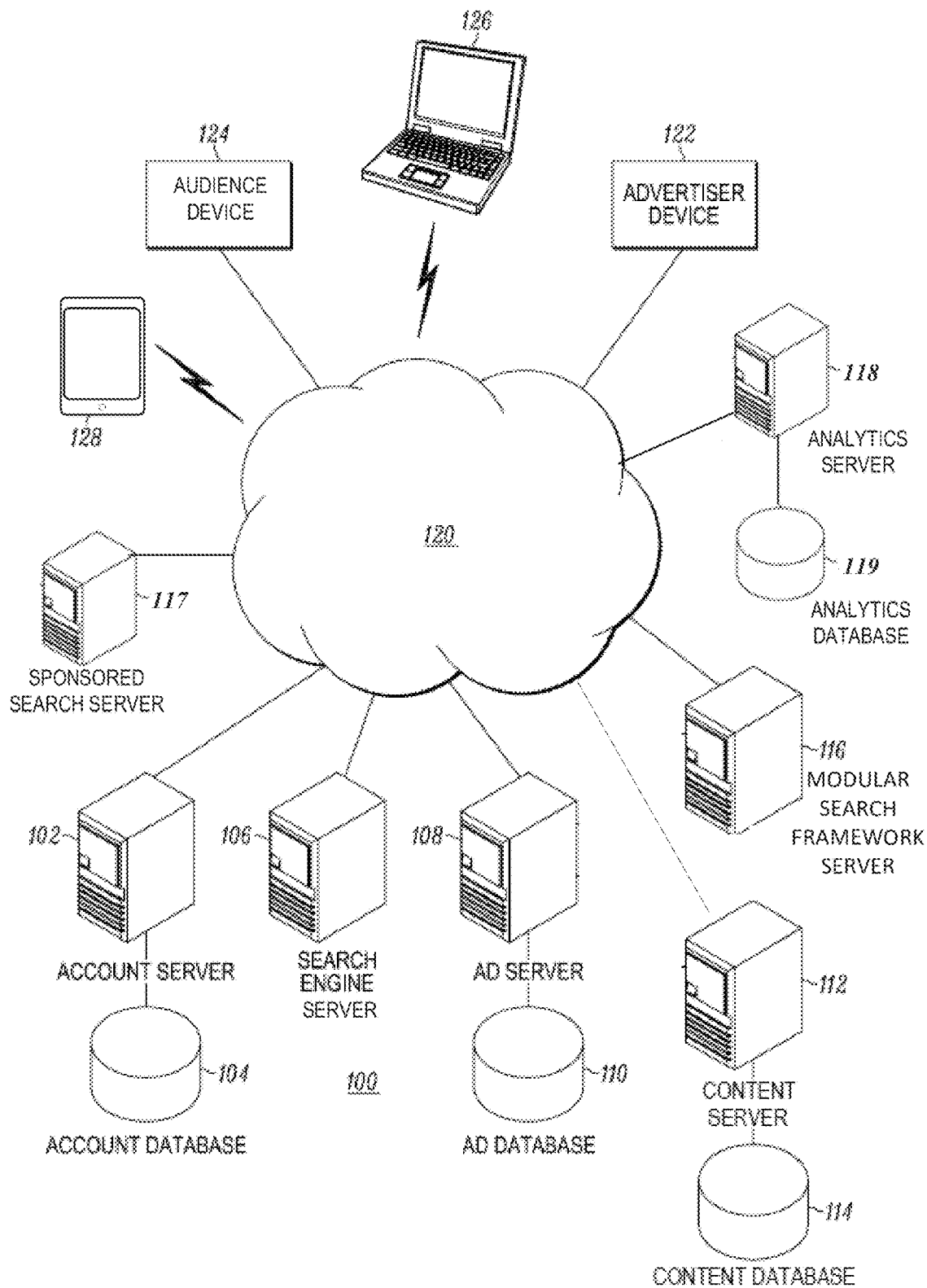
FIG. 1 illustrates a block diagram of an example information system that includes example devices of a network that can provide aspects of a modular search object framework, such as entity sponsorship.

Subject matter will now be described more fully hereinafter with reference to the accompanying drawings, which form a part hereof, and which show, by way of illustration, specific examples. Subject matter may, however, be embodied in a variety of different forms and, therefore, covered or claimed subject matter is intended to be construed as not being limited to examples set forth herein; examples are provided merely to be illustrative. Likewise, a reasonably broad scope for claimed or covered subject matter is intended. Among other things, for example, subject matter may be embodied as methods, devices, components, or systems. The following detailed description is, therefore, not intended to be limiting on the scope of what is claimed.

Overview

Provided herein are novel systems, methods, and circuitry related to the sponsorship and monetization of entity based content (such as entity search results and graphical user interfaces (GUIs)). Also, provide herein are novel systems, methods, and circuitry related to the sponsorship and monetization of modular search objects and frameworks for supporting entity based content, modular search objects, and user interactions with the aforementioned. For example, technologies described herein provide for sponsorship of content within a modular search object framework. The manner of sponsorship and monetization described herein provides for less intrusive advertising and a more manageable environment for online browsing in a mobile context.

When a user searches for a specific business entity, such as a restaurant, usually it is the intent of the user to retrieve information associated with the entity, such as service and product information, contact information, and information regarding related entities. For example, given a food and beverage business, such as a hypothetical coffee company named Green Can Coffee, a user searching online for Green Can Coffee may likely intend to discover a location of a Green Can Coffee storefront, a phone number for that location, and a review on the location and perhaps Green Can Coffee in general. Not only do users want the information, but also they want it delivered quickly and in a seamless manner. This is especially the case with users on mobile devices, since there is a likelihood that the user is on the go. To provide such information with or within conventional lists of search results can be difficult to parse for a user equipped with a small screen. This is especially the case when the user is in transit.

In the mobile context, the user may want the nearest location to an entity, such as a location of a Green Can Coffee storefront. That user may also want directions to the storefront and reviews on the storefront. Also, a user may want to know hours the entity operates, links to coupons or offers the entity is currently providing, and links to download or interact with applications provided or associated with the entity.

Any of the predicted intent of a user can be captured by tracking user interactions with the mobile device and the accompanying applications. The predictions can be based on the tracked interactions and can then be used to provide content a user likely desires. Such functionality and predicted information can be maintained by the entity, an agent of the entity, or the service provider providing the modular search object framework.

To the benefit of the consumer and the advertiser, a content network provider or search engine provider can provide content and search results in a manner that is more digestible to a mobile device user through the framework. As mentioned, a long list of links to webpages may be cumbersome with a smaller display, whether those webpages are adapted for a mobile context or not. Although, the entity model of delivering search results can be combined with more conventional methods within non-mobile contexts, where screen sizes may be larger and user interface peripherals are more likely to be used. Also, advertisers can customize their own summary page or more through the framework in ways that can enhance user experience, which in turn may increase revenue for the advertiser and the service provider monetizing the content. Additionally or alternatively, search results and related GUIs may include algorithmically generated summary sub-GUIs providing a more cohesive experience for a user than a list of search results.

The modular search object framework can bridge a gap in the current state of the art. Human curated results are not scalable amongst a great reach of content. To resolve this issue, automation of content curation can be implemented through the framework. Also, through human curation, updating of content may not be consistent on a large scale. Through the framework, predictive circuitry can regularly and algorithmically generate results and associated GUIs. Additionally or alternatively, such functionality can be enhanced by entity owners providing updated information through data feeds or information management tools. The feeds for business entities may contain information such as office hours, business locations, phone numbers, recent promotions, coupons, application links to their applications at an online application store, and links of extended information such as ratings, reviews, check-in information, images, products sold, and the like. Further, such information can be provided to an advertiser's audience by context of a user in the audience. For example, such information, including entity related applications, may be delivered according to an interest profile of the user and/or a geographic location of the user.

Additionally, the provider of an online entity module served through the framework can charge the actual entity or at least a claimer of the online entity a fee for sponsorship of the online module associated with the entity. Hence, the online entity module becomes a sponsored entity module, and aspects of that entity module can be monetized and paid for by the sponsor to the provider. The aspects may include clickable links, monitored content, applications, such as widgets, and the like. Charges may be derived from impressions of the aforementioned, or user interactions with the aforementioned, such as clicks on links, content dwell times, and gestures on application controls.

DESCRIPTION OF THE DRAWINGS

Prior to the detailed description of the drawings, provided are explanations of terms used within the description of the drawings and the remainder of the disclosure.

An entity search result is a search result that is based (such as based exclusively) on an entity (such as a particular person, place, or thing). An entity search result or other form of entity based content delivery, such as an entity graphical user interface (GUI), is distinguishable from non-entity content in that in a system, such as a system of a content provider, content for a particular entity is delivered through a single root object made up of one or more sub-objects. With a non-entity search result, the result is not necessarily associated with one root object for a particular entity; there may be many root search results for a particular entity. Also, in a non-entity based system, there may be multiple root graphical user interfaces (GUIs), such as multiple root webpages, for a single entity. In an entity based content system, there is one root object per entity. In one example of an entity based system, there may be only one webpage per entity. For example, for the thing Green Can Coffee, in such an entity based system, there is only one root object for the thing Green Can Coffee (such as one root webpage for Green Can Coffee the business). Whereas, in a non-entity based content system, there may be many root objects for the thing Green Can Coffee. For example with a non-entity content delivery system, there may be many different root webpages and websites for the thing Green Can coffee. With an entity based content delivery system, there is only one root object. Given that there is only one root object per entity in the framework, there may be many entity sub-objects under the entity root object. WIKIPEDIA™ may be considered an entity based system of content delivery. One aspect of the framework described herein attempts to remove ambiguity with entities, which may be experienced with WIKIPEDIA™. In an example of the framework, entities that may cause ambiguity in the system may be denied entry into the system.

The framework can provide monetized and/or sponsored online information, such as monetized and/or sponsored entity search results and related GUIs. Online information or a graphical element containing such information is monetized when such information or element is utilized as a source of revenue. Online information or a graphical element containing such information is sponsored when such information or element is paid for or at least claimed by an entity, such as an advertiser. An advertiser may be an advertising organization, person, group of people, or any combination thereof.

In the framework, presentation of aggregated search results may be dynamic and interactive. Also, in the framework, entity search results (and even search suggestions and non-entity search results) may try to match the intent of the searcher, such as according to a search query entered by the searcher. Also, a user or group profile associated with the searcher may be used to determine user intent. The presentation of search results contained on multiple interactive objects may include links and other forms of information attached and viewable on an interactive object. Such information may include a summary on the entity and more. The information on such objects may include detailed information regarding the entity and links to related entities. Such information may be provided via one root GUI object per entity and sub-GUI objects of the root GUI object, such as information provided through an entity tray and cards within the tray. The entity root GUI object and each sub-GUI object may include various information regarding the entity or entities related to the entity. For example, a tray may be presented for a particular thing (such as tray 201*a* for Green Can Coffee the business), and a sub-GUI of the tray, such as a card, may present a map to locations of storefronts for Green Can Coffee. Each location may be a place entity in the framework. In one example, the search results provided by the framework may appear as a list that appears as a stack of cards on a display device. Within such a list only sponsored search results may be displayed. Alternatively, sponsored search results may be mixed in with non-sponsored search results.

In the example where the framework presents a stack of cards search results or any other two- or three-dimensional form for a list of search results, such results may be graphically enhanced (such as photographically enhanced). Also, the framework results may be combined in a list with search suggestions. Furthermore, such a list may be interactive in that each object in the list may be moved, expanded, shrunken, minimized, and even hidden by a user interacting with the list. Entity search results in a list provided by the framework (opposed to non-entity search results and/or search suggestions) may be emphasized such as by graphical enhancement. The enhancement may even be tactile or through audio output or some other form of perceivable output.

Additionally or alternatively, the search results and other GUIs of the framework may organize results and information according to user intent. In an example, user intent can be predicted from an inputted search query. In such an example, corresponding search results can be listed in an order that reflects what the framework has predicted as the information the user intended to receive when inputting the search query. Also, user intent can be reflected in the arrangement and formatting of entity GUIs and sub-GUIs presented to the user. Also, information within an entity GUI may be arranged and formatted according to the predicted user intent.

FIG. 1 illustrates a block diagram of an example information system that includes example devices of a network that can provide a modular search object framework; and through the framework can provide monetized and/or sponsored online information, such as monetized and/or sponsored entity search results and related GUIs. Online information or a graphical element containing such information is monetized when such information or element is utilized as a source of revenue. Online information or a graphical element containing such information is sponsored when such information or element is paid for or at least claimed by an advertiser such as an advertising organization, person, group of people, or any combination thereof.

The information system 100 in the example of FIG. 1 includes an account server 102, an account database 104, a search engine server 106, an ad server 108, an ad database 110, a content database 114, a content server 112, a modular search framework server 116 (which can also be communicatively coupled with a corresponding database), a sponsored search server 117 (which can also be communicatively coupled with a corresponding database), an analytics server 118, and an analytics database 119. The aforementioned servers and databases can be communicatively coupled over a network 120.

The information system 100 may be accessible over the network 120 by advertiser devices, such as an advertiser client device 122 and by audience devices, such as an audience client device 124. An audience device can be a client device that presents online content, such as entity and non-entity search results, search suggestions, content, and advertisements, to a user. Entity and non-entity search results can be monetized and/or sponsored. In various examples of such an online information system, users may search for and obtain content from sources over the network 120, such as obtaining content from the search engine server 106, the ad server 108, the ad database 110, the content server 112, the content database 114, the modular search framework server 116, and the sponsored search server 117. Advertisers may provide advertisements for placement on electronic properties, such as webpages, and other communications sent over the network to audience devices, such as the audience client device 124. The online information system can be deployed and operated by an online services provider, such as Yahoo! Inc.

The account server 102 stores account information for advertisers. The account server 102 is in data communication with the account database 104. Account information may include database records associated with each respective advertiser. Suitable information may be stored, maintained, updated and read from the account database 104 by the account server 102. Examples include advertiser identification information, advertiser security information, such as passwords and other security credentials, account balance information, and information related to content associated with their ads, and user interactions associated with their ads and associated content. Also, examples include analytics data related to their ads and associated content and user interactions with the aforementioned. In an example, the analytics data may be in the form of one or more sketches, such as in the form of a sketch per audience segment, segment combination, or at least part of a campaign. The account information may include ad booking information. This booking information can be used as input for determining ad impression availability.

The account server 102 may be implemented using a suitable device. The account server 102 may be implemented as a single server, a plurality of servers, or another type of computing device known in the art. Access to the account server 102 can be accomplished through a firewall that protects the account management programs and the account information from external tampering. Additional security may be provided via enhancements to the standard communications protocols, such as Secure HTTP (HTTPS) or the Secure Sockets Layer (SSL). Such security may be applied to any of the servers of FIG. 1, for example.

The account server 102 may provide an advertiser front end to simplify the process of accessing the account information of an advertiser (such as a client-side application). The advertiser front end may be a program, application, or software routine that forms a user interface. In a particular example, the advertiser front end is accessible as a website with electronic properties that an accessing advertiser may view on an advertiser device, such as the advertiser client device 122. The advertiser may view and edit account data and advertisement data, such as ad booking data, using the advertiser front end. After editing the advertising data, the account data may then be saved to the account database 104.

Also, audience analytics, impressions delivered, impression availability, and segments may be viewed in real time using the advertiser front end. The advertiser front end may be a client-side application, such as a client-side application running on the advertiser client device. A script and/or applet (such as a script and/or applet) may be a part of this front end and may render access points for retrieval of the audience analytics, impressions delivered, impression availability, and segments. In an example, this front end may include a graphical display of fields for selecting an audience segment, segment combination, or at least part of a campaign. The front end, via the script and/or applet, can request the audience analytics, impressions delivered, and impression availability for the audience segment, segment combination, or at least part of a campaign. The information can then be displayed, such as displayed according to the script and/or applet.

The search engine server 106, the modular search framework server 116, the sponsored search server 117, or any combination thereof may be one or more servers. Alternatively, the search engine server 106, the modular search framework server 116, the sponsored search server 117, or any combination thereof may be a computer program, instructions, or software code stored on a computer-readable storage medium that runs on one or more processors of one or more servers. The search engine server 106, the modular search framework server 116, the sponsored search server 117, or any combination thereof may be accessed by audience devices, such as the audience client device 124 operated by an audience member over the network 120. Access may be through graphical access points. For example, query entry box (such as the query entry box 212 illustrated in FIGS. 2a-3a and 4a-6b) may be an access point for the user to submit a search query to the search engine server 106, the modular search framework server 116, the sponsored search server 117, or any combination thereof, from the audience client device 124. Search queries submitted or other user interactions with such servers can be logged in data logs, and such logs may be communicated to the analytics server 118 for processing. After processing, the analytics server 118 can output corresponding analytics data to be served to the search engine server 106, the modular search framework server 116, the sponsored search server 117, or any combination thereof for determining entity and non-entity non-sponsored search results, entity and non-entity sponsored search results, and other types of content and ad impressions. Analytics circuitry may be used to determine analytics data, and such circuitry may be embedded in any one of the servers and client devices illustrated in FIG. 1.

Besides a search query, the audience client device 124 can communicate interactions with a search result and/or a search suggestion, such as interactions with a sub-GUI associated with the search result appearing on the same page view as the search result. Such interactions can be communicated to any one of the servers illustrated in FIG. 1, for example. The search engine server 106, the modular search framework server 116, the sponsored search server 117, or any combination thereof can locate information matching the queries and the interactions using a suitable protocol or algorithm and returns the matching information to the audience client device 124, such as in the form of search suggestions, monetized and/or sponsored search results, entity search results, non-entity search results, associated GUIs, and any combination thereof. An example of non-entity search results can include a list of webpage search results. Webpage search results may include a link to a corresponding webpage and a short corresponding blurb and/or text scraped from the webpage. The search engine server 106, the modular search framework server 116, the sponsored search server 117, or any combination thereof may receive user interaction information, that can include search queries, from an audience device, and send corresponding information to the ad server 108 and/or the content server 112, and the ad server 108 and/or the content server 112 may serve corresponding ads and/or search results, but with more in-depth details or accompanying GUIs and sub-GUI for interacting with subject matter associated with ads, entity search results, non-entity search results, or any combination thereof. The information inputted and/or outputted by these devices may be logged in data logs and communicated to the analytics server 118 for processing, over the network 120. The analytics server 118 can provide analyzed feedback for affecting future serving of content. For example, the analytics server 118 can provide feedback for affecting serving of ads, search suggestions, entity search results, non-entity search results, respective GUIs (such as sponsored entity trays 201a-201c illustrated in FIGS. 2b-6a, respectively, and sub-GUIs (such as sponsored "more" GUI 602 illustrated in FIG. 6b and sponsored miniature tray 318b illustrated in FIG. 3a) included with and/or associated with the ads, search suggestions, entity search results, and non-entity search results, or any combination thereof.

The search engine server 106, the modular search framework server 116, the sponsored search server 117, or any combination thereof may be designed to help users and potential audience members find information located on the Internet or an intranet. In an example, these servers or any combination thereof may also provide to the audience client device 124 over the network 120 an electronic property, such as a webpage and/or entity tray, with content, including search results, ads, information matching the context of a user inquiry, links to other network destinations, or information and files of information of interest to a user operating the audience client device 124, as well as a stream or webpage of content items and advertisement items selected for display to the user. The aforementioned provided properties and information, solely or in any combination, may be monetized and/or sponsored. The aforementioned properties and information provided by these servers or any combination thereof may also be logged, and such logs may be communicated to the analytics server 118 for processing, over the network 120. Once processed into corresponding analytics data, the analytics server 118 can provide analyzed feedback for affecting future serving of content. For example, the analytics server 118 can provide feedback for affecting serving of ads, search suggestions, entity search results, non-entity search results, respective GUIs and sub-GUIs included with and/or associated with the ads, search suggestions, entity search results, and non-entity search results, or any combination thereof.

The search engine server 106, the modular search framework server 116, the sponsored search server 117, or any combination thereof may enable a device, such as the advertiser client device 122, the audience client device 124, or another type of client device, to search for files of interest using a search query, such as files associated with sponsored entity trays. Typically, these servers or any combination thereof may be accessed by a client device over the network 120. These servers or any combination thereof may include a crawler component, an indexer component, an index storage component, a search component, a ranking component, a cache, a user or group profile storage component, an entity storage component, a logon component, a user or group profile builder, an entity builder, and application program interfaces (APIs), such as APIs corresponding with the modular search framework. These servers or any combination thereof may be deployed in a distributed manner, such as via a set of distributed servers, for example. Components may be duplicated within a network, such as for redundancy or better access.

The ad server 108 operates to serve advertisements to audience devices, such as the audience client device 124. An advertisement may include text data, graphic data, image data, video data, or audio data. Advertisements may also include data defining advertisement information that may be of interest to a user of an audience device. The advertisements may also include respective audience targeting information or ad campaign information, such as information on audience segments and segment combinations. An advertisement may further include data defining links to other online properties reachable through the network 120, such as to sponsored and non-sponsored entity trays. Also, entity GUIs and other types of properties (such as sponsored entity trays and sub-GUIs related to those trays) may be or include an advertisement. The aforementioned audience targeting information and the other data associated with an ad may be logged in data logs and such logs may be communicated to the analytics server 118 for processing. Once processed into corresponding analytics data, the analytics server 118 can provide analyzed feedback for affecting future serving of content, such as monetized and/or sponsored content. For example, the analytics server 118 can provide feedback for affecting serving of ads, search suggestions, entity search results, non-entity search results, respective GUIs and sub-GUIs included with and/or associated with the ads, search suggestions, entity search results, and non-entity search results, and any combination thereof.

For online service providers, advertisements may be displayed on electronic properties resulting from a user-defined search based, at least in part, upon search terms. Advertising may be beneficial to users, advertisers or web portals if displayed advertisements are relevant to audience segments, segment combinations, or at least parts of campaigns. Thus, a variety of techniques have been developed to determine corresponding audience segments or to subsequently target relevant advertising to audience members of such segments. For example user interests, user intentions, and targeting data related to segments or campaigns may be may be logged in data logs and such logs may be communicated to the analytics server 118 for processing. Once processed into corresponding analytics data, the analytics server 118 can provide analyzed feedback for affecting future serving of content.

One approach to presenting targeted advertisements includes employing demographic characteristics (such as age, income, sex, occupation, etc.) for predicting user behavior, such as by group. Advertisements may be presented to users in a targeted audience based, at least in part, upon predicted user behavior. The aforementioned targeting data, such as demographic data and psychographic data, may be logged in data logs and such logs may be communicated to the analytics server 118 for processing. Once processed into corresponding analytics data, the analytics server 118 can provide analyzed feedback for affecting future serving of content.

Another approach includes profile-type ad targeting. In this approach, user or group profiles specific to a respective user or group may be generated to model user behavior, for example, by tracking a user's path through a website or network of sites, and compiling a profile based, at least in part, on entity GUIs (such as entity trays), webpages, and advertisements ultimately delivered. A correlation may be identified, such as for user purchases, for example. An identified correlation may be used to target potential purchasers by targeting content or advertisements to particular users. The aforementioned profile-type targeting data may be logged in data logs and such logs may be communicated to the analytics server 118 for processing. Once processed into corresponding analytics data, the analytics server 118 can provide analyzed feedback for affecting future serving of content.

Yet another approach includes targeting based on content of an electronic property requested by a user, such as content of an entity GUI (such as an entity tray) or webpage requested by a user. Advertisements may be placed on an electronic property or in association with other content that is related to the subject of the advertisements. The relationship between the content and the advertisement may be determined in a suitable manner. The overall theme of a particular electronic property may be ascertained, for example, by analyzing the content presented therein. Moreover, techniques have been developed for displaying advertisements geared to the particular section of the article currently being viewed by the user. Accordingly, an advertisement may be selected by matching keywords, and/or phrases within the advertisement and the electronic property. The aforementioned targeting data may be logged in data logs and such logs may be communicated to the analytics server 118 for processing. Once processed into corresponding analytics data, the analytics server 118 can provide analyzed feedback for affecting future serving of content.

The ad server 108 includes logic and data operative to format the advertisement data for communication to a user device, such as an audience member device. The ad server 108 is in data communication with the ad database 110. The ad database 110 stores information, including data defining advertisements, to be served to user devices. This advertisement data may be stored in the ad database 110 by another data processing device or by an advertiser. The advertising data may include data defining advertisement creatives and bid amounts for respective advertisements and/or audience segments. The aforementioned ad formatting and pricing data may be logged in data logs and such logs may be communicated to the analytics server 118 for processing. Once processed into corresponding analytics data, the analytics server 118 can provide analyzed feedback for affecting future serving of content.

The advertising data may be formatted to an advertising item that may be included in a stream of content items and advertising items provided to an audience device. The formatted advertising items can be specified by appearance, size, shape, text formatting, graphics formatting and included information, which may be standardized to provide a consistent look and feel for advertising items in the stream. Such a stream may be included in or combined with an entity GUI (such as an entity tray). Also, a related entity GUI can include a similar appearance, size, shape, text formatting, graphics formatting and included information to provide a consistent look and feel between the entity GUI and the stream. Also, sponsored entity GUIs and sub-GUIs, opposed to non-sponsored entity GUIs and sub-GUIs, can include a similar appearance, size, shape, text formatting, graphics formatting, or combination thereof to provide a consistent look and feel between each other and/or a sponsored stream. Additionally, data related to the aforementioned formatting may be logged in data logs and such logs may be communicated to the analytics server 118 for processing. Once processed into corresponding analytics data, the analytics server 118 can provide analyzed feedback for affecting future serving of content.

Further, the ad server 108 is in data communication with the network 120. The ad server 108 communicates ad data and other information to devices over the network 120. This information may include advertisement data communicated to an audience device. This information may also include advertisement data and other information communicated with an advertiser device, such as the advertiser client device 122. An advertiser operating an advertiser device may access the ad server 108 over the network to access information, including advertisement data. This access may include developing advertisement creatives, editing advertisement data, deleting advertisement data, setting and adjusting bid amounts and other activities. This access may also include a portal for interacting with, viewing analytics associated with, and editing parts of entity GUIs (such as entity trays) the advertiser at least partially controls or owns. The ad server 108 then provides the ad items and/or entity GUIs to other network devices, such as the modular search framework server 116, the analytics server 118, and/or the account server 102, for classification (such as associating the ad items and/or entity GUIs with audience segments, segment combinations, or at least parts of campaigns). This information can be used to provide feedback for affecting serving of ads, search suggestions, entity search results, non-entity search results, respective GUIs and sub-GUIs included with and/or associated with the ads, search suggestions, entity search results, and non-entity search results, or any combination thereof.

The ad server 108 may provide an advertiser front end to simplify the process of accessing the advertising data of an advertiser. The advertiser front end may be a program, application or software routine that forms a user interface. In one particular example, the advertiser front end is accessible as a website with electronic properties that an accessing advertiser may view on the advertiser device. The advertiser may view and edit advertising data using the advertiser front end. After editing the advertising data, the advertising data may then be saved to the ad database 110 for subsequent communication in advertisements to an audience device.

The ad server 108, the content server 112, or any other server described herein may be one or more servers. Alternatively, the ad server 108, the content server 112, or any other server described herein may be a computer program, instructions, and/or software code stored on a computer-readable storage medium that runs on one or more processors of one or more servers. The ad server 108 may access information about ad items either from the ad database 110 or from another location accessible over the network 120. The ad server 108 communicates data defining ad items and other information to devices over the network 120. The content server 112 may access information about content items either from the content database 114 or from another location accessible over the network 120. The content server 112 communicates data defining content items and other information to devices over the network 120. Content items and the ad items may include any form of content included in ads, search suggestions, entity search results, non-entity search results, respective GUIs and sub-GUIs included with and/or associated with the ads, search suggestions, entity search results, and non-entity search results, or any combination thereof.

The information about content items may also include content data and other information communicated by a content provider operating a content provider device, such as respective audience segment information and possible links to entity search results, trays, and other types of entity GUIs. A content provider operating a content provider device may access the content server 112 over the network 120 to access information, including the respective segment information, entity search result information, and entity GUI information. This access may be for developing content items, editing content items, deleting content items, setting and adjusting bid amounts and other activities, such as associating content items with audience segments, segment combinations, or at least parts of campaigns. A content provider operating a content provider device may also access the analytics server 118 over the network 120 to access analytics data. Such analytics may help focus developing content items, editing content items, deleting content items, setting and adjusting bid amounts, and activities related to distribution of the content, such as distribution of content via monetized and sponsored entity search results and GUIs (such as monetized and sponsored entity trays).

The content server 112 may provide a content provider front end to simplify the process of accessing the content data of a content provider. The content provider front end may be a program, application or software routine that forms a user interface. In a particular example, the content provider front end is accessible as a website with electronic properties that an accessing content provider may view on the content provider device. The content provider may view and edit content data using the content provider front end. After editing the content data, such as at the content server 112 or another source of content, the content data may then be saved to the content database 114 for subsequent communication to other devices in the network 120, such as devices administering monetized and sponsored entity search results and GUIs.

The content provider front end may be a client-side application, such as a client-side application running on the advertiser client device or the audience client device, respectively. A script and/or applet, such as the script and/or applet, may be a part of this front end and may render access points for retrieval of impression availability data (such as the impression availability data), and the script and/or applet may manage the retrieval of the impression availability data. In an example, this front end may include a graphical display of fields for selecting audience segments, segment combinations, or at least parts of campaigns. Then this front end, via the script and/or applet, can request the impression availability for the audience segments, segment combinations, or at least parts of campaigns. The analytics can then be displayed, such as displayed according to the script and/or applet. Such analytics may also be used to provide feedback for affecting serving of ads, search suggestions, entity search results, non-entity search results, respective GUIs and sub-GUIs included with and/or associated with the ads, search suggestions, entity search results, and non-entity search results, and any combination thereof.

The content server 112 includes logic and data operative to format content data for communication to the audience device. The content server 112 can provide content items or links to such items to the analytics server 118 and/or the modular search framework server 116 for analysis or associations with entities, respectively. For example, content items and links may be matched to data and circuitry, such as entity data and circuitry and even module circuitry and data (e.g., module circuitry 910 in FIG. 9). The matching may be complex and may be based on historical information related to the audience segments and impression availability.

The content data may be formatted to a content item that may be included in a stream of content items and advertisement items provided to an audience device. The formatted content items can be specified by appearance, size, shape, text formatting, graphics formatting and included information, which may be standardized to provide a consistent look and feel for content items in the stream. Such a stream may be included in or combined with an entity GUI (such as an entity tray). Also, a related entity GUI can include a similar appearance, size, shape, text formatting, graphics formatting and included information to provide a consistent look and feel between the entity GUI and the stream. Additionally, aforementioned formatting data may be logged in data logs and such logs may be communicated to the analytics server 118 for processing. Once processed into corresponding analytics data, the analytics server 118 can provide analyzed feedback for affecting future serving of content.

In an example, the content items may have an associated bid amount that may be used for ranking or positioning the content items in a stream of items presented to an audience device. In other examples, the content items do not include a bid amount, or the bid amount is not used for ranking the content items. Such content items may be considered non-revenue generating items. The bid amounts and other related information may be logged in data logs and such logs may be communicated to the analytics server 118 for processing. Once processed into corresponding analytics data, the analytics server 118 can provide analyzed feedback for affecting future serving of content.

The aforementioned servers and databases may be implemented through a computing device. A computing device may be capable of sending or receiving signals, such as over a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally, a server may include a central processing unit and memory. A server may also include a mass storage device, a power supply, wired and wireless network interfaces, input/output interfaces, and/or an operating system, such as Windowsill Server, Mac OS X™, UNIX™, Linux™, FreeBSD™, or the like.

The aforementioned servers and databases may be implemented as online server systems or may be in communication with online server systems. An online server system may include a device that includes a configuration to provide data via a network to another device including in response to received requests for page views, entity search results and GUIs (such as entity trays), or other forms of content delivery. An online server system may, for example, host a site, such as a social networking site, examples of which may include, without limitation, Flicker, Twitter, Facebook, LinkedIn, or a personal user site (such as a blog, vlog, online dating site, etc.). Such sites may be integrated with the framework via the modular search framework server 116. An online server system may also host a variety of other sites, including, but not limited to business sites, educational sites, dictionary sites, encyclopedia sites, wikis, financial sites, government sites, etc. These sites, as well, may be integrated with the framework via the modular search framework server 116.

An online server system may further provide a variety of services that may include web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as an online server system include desktop computers, multiprocessor systems, microprocessor-type or programmable consumer electronics, etc. The online server system may or may not be under common ownership or control with the servers and databases described herein.

The network 120 may include a data communication network or a combination of networks. A network may couple devices so that communications may be exchanged, such as between a server and a client device or other types of devices, including between wireless devices coupled via a wireless network, for example. A network may also include mass storage, such as a network attached storage (NAS), a storage area network (SAN), or other forms of computer or machine readable media, for example. A network may include the Internet, local area networks (LANs), wide area networks (WANs), wire-line type connections, wireless type connections, or any combination thereof. Likewise, sub-networks, may employ differing architectures or may be compliant or compatible with differing protocols, and may interoperate within a larger network, such as the network 120.

Various types of devices may be made available to provide an interoperable capability for differing architectures or protocols. For example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links, including satellite links, or other communication links or channels, such as may be known to those skilled in the art. Furthermore, a computing device or other related electronic devices may be remotely coupled to a network, such as via a telephone line or link, for example.

The advertiser client device 122 includes a data processing device that may access the information system 100 over the network 120. The advertiser client device 122 is operative to interact over the network 120 with any of the servers or databases described herein. The advertiser client device 122 may implement a client-side application for viewing electronic properties and submitting user requests. The advertiser client device 122 may communicate data to the information system 100, including data defining electronic properties and other information. The advertiser client device 122 may receive communications from the information system 100, including data defining electronic properties and advertising creatives. The aforementioned interactions and information may be logged in data logs and such logs may be communicated to the analytics server 118 for processing. Once processed into corresponding analytics data, the analytics server 118 can provide analyzed feedback for affecting future serving of content.

In an example, content providers may access the information system 100 with content provider devices that are generally analogous to the advertiser devices in structure and function. The content provider devices provide access to content data in the content database 114, for example.

The audience client device 124 includes a data processing device that may access the information system 100 over the network 120. The audience client device 124 is operative to interact over the network 120 with the search engine server 106, the ad server 108, the content server 112, and the analytics server 118, and the modular search framework server 116. The audience client device 124 may implement a client-side application for viewing electronic content and submitting user requests. A user operating the audience client device 124 may enter a search request and communicate the search request to the information system 100. The search request is processed by the search engine and search results are returned to the audience client device 124. The aforementioned interactions and information may be logged in data logs and such logs may be communicated to the analytics server 118 for processing. Once processed into corresponding analytics data, the analytics server 118 can provide analyzed feedback for affecting future serving of content.

In other examples, a user of the audience client device 124 may request data, such as a page of information from the online information system 100. The data instead may be provided in another environment, such as a native mobile application, TV application, or an audio application. The online information system 100 may provide the data or re-direct the browser to another source of the data. In addition, the ad server may select advertisements from the ad database 110 and include data defining the advertisements in the provided data to the audience client device 124. The aforementioned interactions and information may be logged in data logs and such logs may be communicated to the analytics server 118 for processing. Once processed into corresponding analytics data, the analytics server 118 can provide analyzed feedback for affecting future serving of content.

The advertiser client device 122 and the audience client device 124 operate as a client device when accessing information on the information system 100. A client device, such as the advertiser client device 122 and the audience client device 124 may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the foregoing devices, or the like. In the example of FIG. 1, both laptop computer 126 and smartphone 128, which can be client devices, may be operated as either an advertiser device or an audience device.

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include a physical or virtual keyboard, mass storage, an accelerometer, a gyroscope, global positioning system (GPS) or other location-identifying type capability, or a display with a high degree of functionality, such as a touch-sensitive color 2D or 3D display, for example.

A client device, such as the advertiser client device 122 and the audience client device 124, may include or may execute a variety of operating systems, including a personal computer operating system, such as a Windows™, iOS™, Linux™, or a mobile operating system, such as iOS™, Android™, or Windows Mobile™, or the like. A client device may include or may execute a variety of possible applications, such as a client software application enabling communication with other devices, such as communicating messages, such as via email, short message service (SMS), or multimedia message service (MMS), including via a network, such as a social network, including, for example, Facebook™, LinkedIn™, Twitter™, Flickr™, or Google™, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally or remotely stored or streamed video, or video games. The foregoing is provided to illustrate that claimed subject matter is intended to include a wide range of possible features or capabilities. At least some of the features, capabilities, and interactions with the aforementioned may be logged in data logs and such logs may be communicated to the analytics server 118 for processing. Once processed into corresponding analytics data, the analytics server 118 can provide analyzed feedback for affecting future serving of content.

Also, the disclosed methods and systems may be implemented at least partially in a cloud-computing environment, at least partially in a server, at least partially in a client device, or in any combination thereof.

FIGS. 2a-6b illustrate screen presentations that can be provided by the modular search object framework. In FIGS.

2*a*-6*b*, the screen presentations are depicted as displayed on a display 202 of a client mobile device 200. However, screen presentations provided by examples of the framework can be adapted to display on a display associated with a personal computer, such as a desktop computer, or a smart television. The display 202 includes a touchscreen configured to receive user input, such as touch gestures.

Within the screen presentations, illustrated are GUIs provided by the framework and GUIs provided by a native operating system and/or a native client-side application, such as a web browser. In an example, only GUIs provided by the framework can be monetized and sponsored. Alternatively, any GUI, whether provided by a native operating system and/or a native client-side application, can be monetized and sponsored. Also, even if the GUIs provided by a native operating system and/or a native client-side application are not monetized or sponsored, impressions and interactions with such GUIs can be tracked and communicated to an analytics server (such as analytics server 118 in FIG. 1) to be analyzed. Once processed into corresponding analytics data, such a server can provide feedback for affecting future serving of content, including sponsored and/or monetized content.

Figures 2A, 2B:
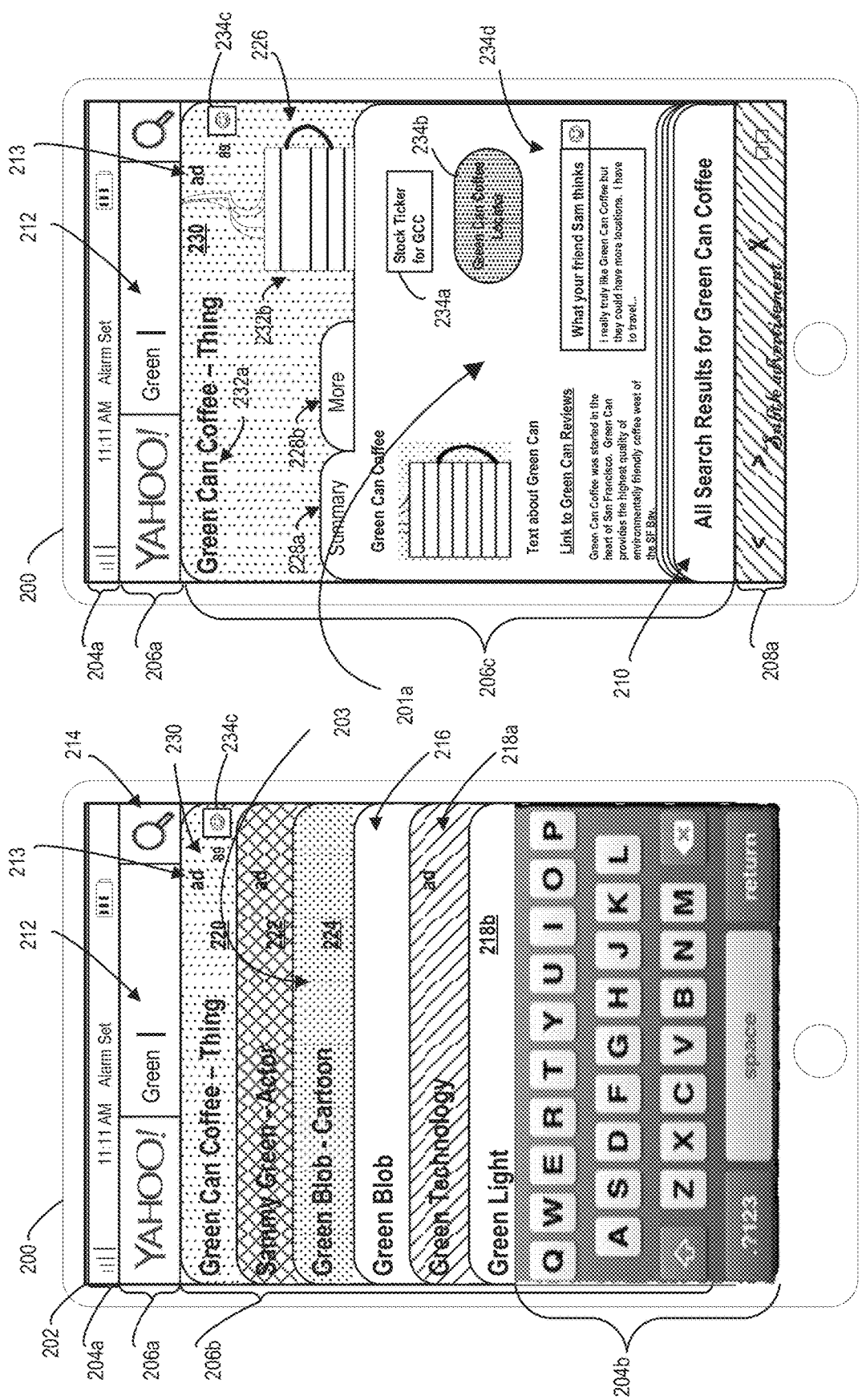
FIG. 2a illustrates displayed entity and non-entity search result objects and search suggestion objects on an example page view rendered by an example client-side application, such as a mobile web browser. The example client-side application can be executed on any one of the client devices illustrated in FIG. 1. Also, some of these objects are sponsored.
FIG. 2b illustrates an example expanded and displayed sponsored entity search result object associated with a company on an example page view rendered by the example client-side application of FIG. 2a. Specifically, this depiction of the expanded object includes an example summary section rendered by example summary circuitry of the modular search object framework. Within the framework, a company entity is a type of thing entity.

In FIG. 2*a*, section 204*a* and touchscreen keyboard 204*b* of the screen presentations are GUI parts provided by a native operating system of the client mobile device 200. Section 206*a* in FIGS. 2*a*-3*a* and 5*a*-6*b* of the screen presentations is a GUI part provided by the framework and/or a service provider associated with the framework, and sections 206*b*-206*m* in FIGS. 2*a*-6*b* include GUI parts provided by the framework. Also, for example, section 208*a* in FIGS. 2*b*, 3*a*, and 5*a*-6*b* is a GUI part provided by the native client-side application executed on the client mobile device 200. In the depicted examples, section 208*a* is sponsored and partially provided by the framework. Sections provided by the native client-side application or operating system that are sponsored may have more restrictive rules for advertising, so that such advertising is not intrusive. Intrusiveness of such advertising within sections native to the client-side application or operating system may be an analytically determined by the analytics server. User interaction with a page view (such as a lack of dwell time or clicking) or the mobile device (such as resetting the display screen or even rebooting the device) can be tracked in a log and then the log can be communicated to the analytics server for intrusiveness analysis. This analysis can then be used by the framework to change such advertising if intrusiveness of the advertising exceeds an intrusiveness threshold.

In an example, GUI parts such as 204*b*, 206*a*, and 208*a* may be hidden by the native operating system, the native client-side application, the framework, or any combination thereof, so that GUI parts provided by the framework such as sections 206*b*-206*m* may be displayed on a greater amount of space on the display 202. Such functionality may result, for a particular native GUI, where that GUI is not sponsored. However, in an example where that native GUI is sponsored the hiding functionality may be turned off. The provider may charge the advertiser for turning off the hiding functionality for the particular GIU when the sponsor's ad is provided on that GUI. This too may be limited if an intrusiveness threshold is exceeded as determined by the analytics server. Even the GUI part 204*a* may be integrated with the framework to use the hiding functionality according to sponsorship. See FIG. 3*b* for an example where the GUI part 204*a* is hidden. In this case it is likely that the GUI part 204*a* was not sponsored or the hiding function was not turned off for an additional fee.

The functionality of hiding GUI parts may occur when a user's finger, such as finger 306 in FIG. 3*b*, interacts with a GUI part within a section provided by the framework, such as section 206*e*. In an example, this functionality and other object movement is enhanced, in that movement and the hiding occurs seamlessly without unwanted visual artifacts, because the native operating system, the native client-side application, and the framework are closely coupled. Because of this coupling, the presentation sponsored affects may also occur without unwanted visual artifacts. For example, circuitry that controls such functionality can be a combination of circuitry of the native operating system, the native client-side application, and the framework, which exists in the host device, such as the mobile client device 200 in FIGS. 2*a*-6*b*.

In an example, GUI parts provided by the framework may interact with GUI parts provided by the native client-side application and the native operating system. These interactions occur seamlessly because of the existence of associated circuitry being local to the client device displaying the GUI parts. Transitions between the various page views and section display changes are illustrated in FIGS. 2*a*-6*b* and FIGS. 6*a*-6*b* can occur without unwanted visual artifacts due to tight coupling between circuitry of the native operating system, the native client-side application, and the framework. For example, parts of the circuitry can include client-side code such as AJAX™, JavaScript™, or any combination thereof.

Alternatively or additionally, the framework may provide animations, including intentional visual artifacts, to provide a visually pleasing transition when transitioning from one displayed feature to another. In an example, even such transitions may be sponsored. With one or more of various animations, advertising may be integrated visually or even through audio output. For example, a semi-transparent layer with a logo ad may overlap the one or more animations in a transition. Also, when transitions are sponsored, such transitions may occur for an additional amount of time than if not sponsored. Further, advertising can be integrated with a theme for visual presentation of the GUI parts of the framework, such as a card theme. The card theme can include GUI sections that include boundaries with curved corners, and GUI sections that can overlap with each other to give the appearance that each section is a card with curved corners. See FIGS. 2*a*-6*b*. The transitions between various visual displays by the framework can include animations including rearranging of cards, such as shuffling of cards. During the rearrangement, one of the displayed cards in the shuffling could be an ad of a sponsor. Alternatively or additionally, the animations can include moving cards into and out of a deck of cards. The deck may include partial fanning in straight and/or rotational directions in a three dimensional graphical space. The animations for a transition can include fanning cards in a deck horizontally along an x-axis, vertically along a y-axis, in or out of the screen along a z-axis, rotationally around any one or combination of the x-, y-, z-axes, or any combination thereof. Likewise, during any of the aforementioned rearranging, one of the moving cards could include an ad.

FIG. 2*a* shows cards fanned out in a vertical direction along a y-axis relative to the display 202. FIG. 2*b* shows one card drawn out of a deck of cards 210 partially fanned out vertically. In a transition between the displaying of section 206*b* to section 206*c*, the fanned out cards of section 206*b* may retract into the deck of cards 210 displayed in section 206*c*, vertically. The cards labeled "summary" and "more" of respective sections 206*c* and 206*d* in FIGS. 2*b* and 3*a*, when transitioning from one card to another may flash from one card to another. Between such flashes an ad may be flashed by a sponsor. Alternatively, transitions of such cards may include an animation including the card moving in and/or out of the deck of cards 210. In an example, while the card is moving it may include an ad that is more visually perceivable while in motion. For example, a simple logo ad may appear on a card while it is in motion. The animation may also include a shuffling of the deck 210. Animation with a shuffling of the deck 210 may also occur when a search query occurs, such as the query entered into the search query box 212. For example, when the framework transitions from providing information on Green Can Coffee in FIGS. 2a-4b to providing information on Katie Bolmes in FIGS. 5a-5b, the deck of cards 210 may shuffle to give the appearance that the deck of cards is being shuffled to find cards related to Katie Bolmes. An animation may also occur when a link or button is clicked that leads to a transition from one entity to another. Also, when a query is entered or at least partially entered, such an action may cause a transition from one entity to another.

Besides visual integration of an ad, a sponsored audio output associated with Katie Bolmes may occur during such transitions. For example, a recognizable song performed by Katie Bolmes may occur during the transition with directions on how to purchase the song. Like visual ads, intrusiveness of audio ads may be tracked, and future rendering of audio output may be affected by findings in the analysis of such tracked information. For example, the corresponding analysis can be used by the framework to change such advertising if intrusiveness of the audio ad exceeds an intrusiveness threshold. Audio and visual intrusiveness thresholds may be separate or combined. Also, the thresholds may be increased for a fee in some examples of the framework.

In an example, transitions within an entity may occur with relatively simple animations, such as flashing between cards, scrolling through related cards arranged side-by-side in a tray of cards in a single direction, or moving one or a few cards at least partially in and out of a deck, per user interaction with the respective entity GUI. Transitions from an entity to another entity may include relatively more complex animations, such as a shuffling of the deck of cards. In some examples, shuffling may occur either between transitions within an entity or from one entity to another. However, in such examples, the shuffling for transitions within an entity may occur for a noticeably less amount of time than the shuffling between entity changes. For example, shuffling due to transitions within an entity may be less than one second, and shuffling due to transitions between entities may be more than 2 seconds. These transition times may be increased for sponsored transitions. For example, such timing may be more than doubled when the transition is sponsored.

Also, in transitions between entities, the entities may bid on the transitions. Also, an alert to purchase a sponsored transition may be communicated to both entities if the transition occurs in an amount exceeding a threshold. This transition threshold may be adjusted, so that if it is found that sponsored transitions are having success, more alerts can be communicated. Also, like many other aspects of the framework, the adjustment of a threshold can be automated according to analytics periodically determined at the analytics server.

FIGS. 2a-6b show example screens of navigation of content, such as sponsored and non-sponsored content, emphasizing various features provided by the framework. One of these features may include the labeling or indication of when content is sponsored. In FIGS. 2a-6b, sponsorship is indicated by the label "ad" (e.g., see labels 213, 313a, 313b, 513, 613a, and 613b). In FIG. 2a, entity search results 220 and 222 are sponsored. Also, the indication of entity search results 220 and 222 being sponsored may indicate that at least part of the corresponding entity trays and their content are sponsored. In FIGS. 2a-4b and 6a, the backdrop 230 includes the ad indicator 213. In instances where a backdrop of an entity tray includes an ad indicator, at least part of the entity tray and its contents are sponsored.

In FIG. 3a, an entity location indicator image link 301 and a scrollable miniature tray 318b are sponsored. The sponsorship of content (such as an image link) and/or a sub-GUI (such as a scrollable miniature tray) can be by the same entity that has sponsored the at least part of the entity tray and its contents or a different sponsor, such as a partner of the tray sponsoring entity. In FIG. 3a, a partner of Green Can Coffee may sponsor content and/or sub-GUIs within the entity tray 201a. Pricing for the sponsorship of sub-GUIs may be discounted for the entity or the partner. Although, Non-related entities may not receive a discount. Although, non-related entities may receive a discount of a particular type of content or sub-GUI that is sponsored globally across entities of the framework or a type of entity of the framework (such as a person entity, place entity, or thing entity). These types of discounts allow for the entity and others to share sponsorship costs within the entity tray, and the framework provider may increase revenue since more than one entity is sponsoring parts and/or content within an entity tray.

FIG. 2a, shows text "Green" entered into a search query box 212 via the virtual keyboard 204b. In an example, the use of a capital letter, such as "G" in "Green" may indicate that the search results are to include entity search results. In such an example, use of only lower case letters may indicate that the search results are not to include entity search results. Alternatively, the use of a capital letter in the search may indicate that the search results are only to include entity search results of the framework and no non-entity search results. In this alternative example, the use of no capital letters in the search may indicate that the search results are to include both entity and non-entity search results. In an example, where non-entity search results are included, search suggestions may be listed as well. Besides tactile input of text, text may be inputted through a voice command or some other form of user input. Use of capital letters is one way of indicating the type of search results desired in examples of the framework, but there may be other ways to indicate the desire to receive entity search results, non-entity search results, search suggestions, or any combination thereof. For example, through voice command entering of a search query a user may request verbally whether it is desired to receive entity search results, non-entity search results, search suggestions, or any combination thereof. For example, the user may input the voice command, "green can only entity" to receive only entity search results for "green can", or the user may input the voice command, "green mix" to receive a mix of search results (such as entity and non-entity search results) and suggestions for "green". Also, within the results there may be sponsored search results, non-sponsored search results, sponsored search suggestions, non-sponsored search suggestions, or any combination thereof. For example in FIG. 2a, search results 220 and 222 and search suggestion 218a are sponsored.

In FIG. 2a, upon entering of "Green" into the box or upon entering "Green" and clicking on the search execution button 214, search suggestions and/or search results can appear on the display 202 within section 206b. For example, upon entering "Green" into the box 212, but before clicking on the search execution button 214, search topic suggestions may appear, such as the sponsored search suggestion 218a. A user may select one of these suggestions, which causes execution of a query using the respective text displayed within the suggestion. In an example, where the suggestion is sponsored, results that occur from executing a search linked to the sponsored suggestion can be adapted to include at least one advertisement of the sponsor. Also, depending on a status of or fee paid by the sponsor that at least one advertisement may occur at the top and/or forefront of the results.

In FIGS. 2a-6b, the suggestions appear as cards. These suggestion cards may have a similar color and texture scheme, and the scheme may be simple, such as one solid color or a spectrum of colors within a range of a full spectrum of colors. For example, the suggestion cards may each be various shades of blue. Also, upon entering "Green" into the box 212, actual search results may appear, such as search results associated with a specific entity, such as a particular person, place, or thing. In this example, the entity search results include search results 220, 222, and 224 in FIG. 2a. These results appear as cards too. These search result cards may have different color and texture schemes, and may include schemes associated with a photograph, such as a photograph bled out onto a card. This visual feature helps a user distinguish between a search result card, such as an entity search result card, and a search suggestion card (and optionally a non-entity search result card). Also, an entity search result can be visually distinguished from a set of non-entity search results, such as a set of webpage search results, by the color and texture scheme of the cards representing the entity results. For example, a simple one-color range theme may represent a set of webpage search results, whereas a more complex theme, such as a bled out photograph, may represent an entity search result. In FIG. 2a, entity search results 220-224 are visually distinguishable from each other and webpage based search result 216. Also, sponsored entity search results are visually distinguishable from sponsored search suggestion 218a. The non-sponsored web page results 216 are not thematically distinguishable from the non-sponsored search suggestion 218b. In examples, visual schemes may be different between sponsored suggestions, non-sponsored suggestions, sponsored non-entity search results, non-sponsored non-entity search results, sponsored entity search results, non-sponsored entity search results, or any combination thereof. For example, sponsored suggestions and sponsored search results may have color and/or texture schemes that are similar and more emphasized than non-sponsored suggestions and search results.

In the example shown in FIGS. 2a and 2b, a user may select one of the search results (such as entity search result 220, 222, or 224) shown in FIG. 2a, which causes the page view to transition from displaying the fanned out search results and suggestions to a full-size card including information on the selected entity, such as shown in FIG. 2b. For example, a user may have selected the entity search result 220, labeled with "Green Can Coffee—Thing", resulting in the display of a full-size card for the entity, Green Can Coffee, the thing. A full-size card is a card that includes the graphical functionality of an entity tray. In other words, a full-size card may be a primary GUI for an entity tray.

Figures 5A, 5B:
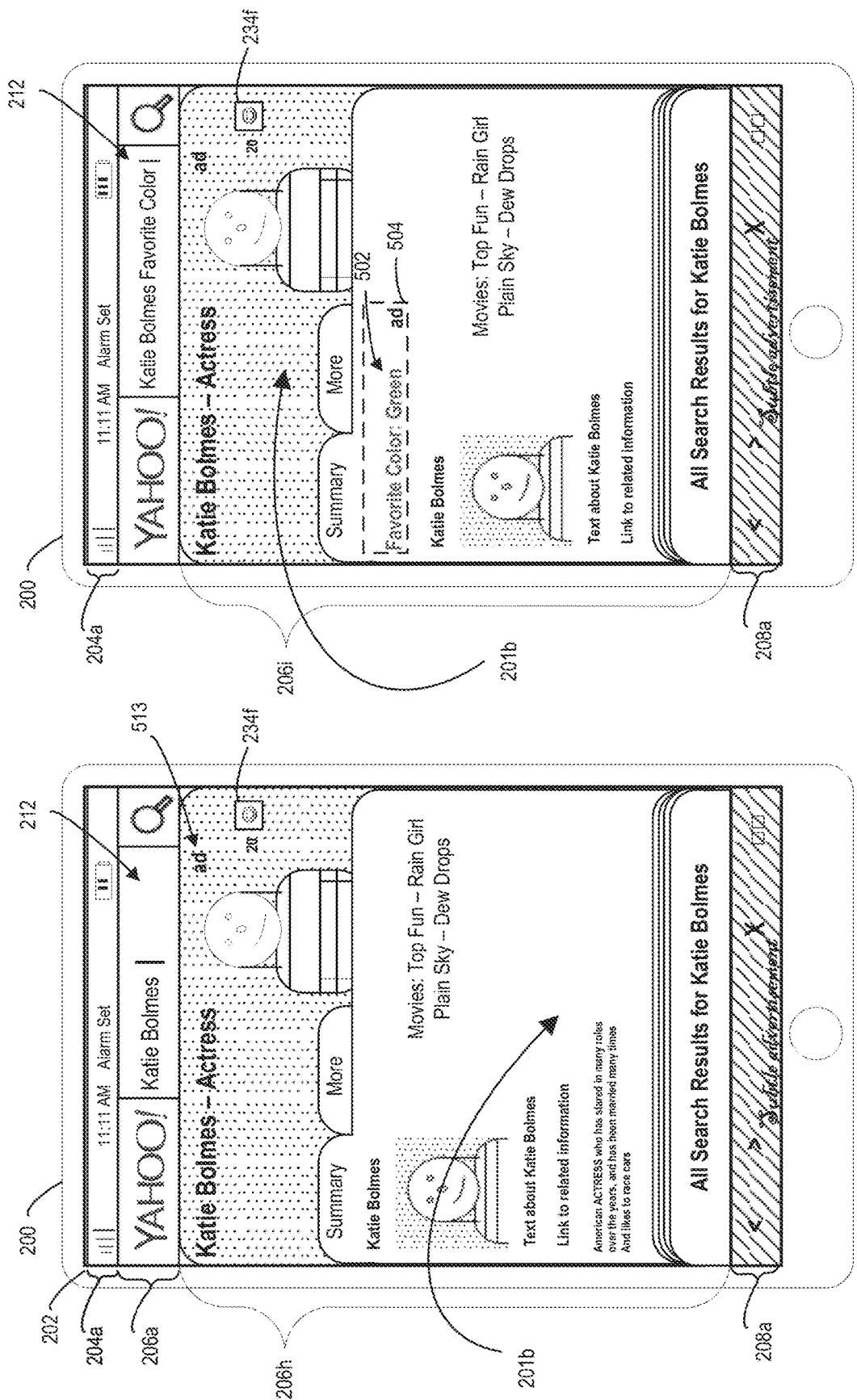
FIG. 5a illustrates an example expanded and displayed sponsored entity search result object on an example page view rendered by the client-side application. Specifically, this depiction of the displayed object includes an example summary section rendered by example summary circuitry of the modular search object framework.
FIG. 5b illustrates the example displayed entity search result object in FIG. 5a. However, this depiction of the displayed object includes an example summary section and an example predicted answer section rendered by respective circuitry of the modular search object framework.
Figure 6B:
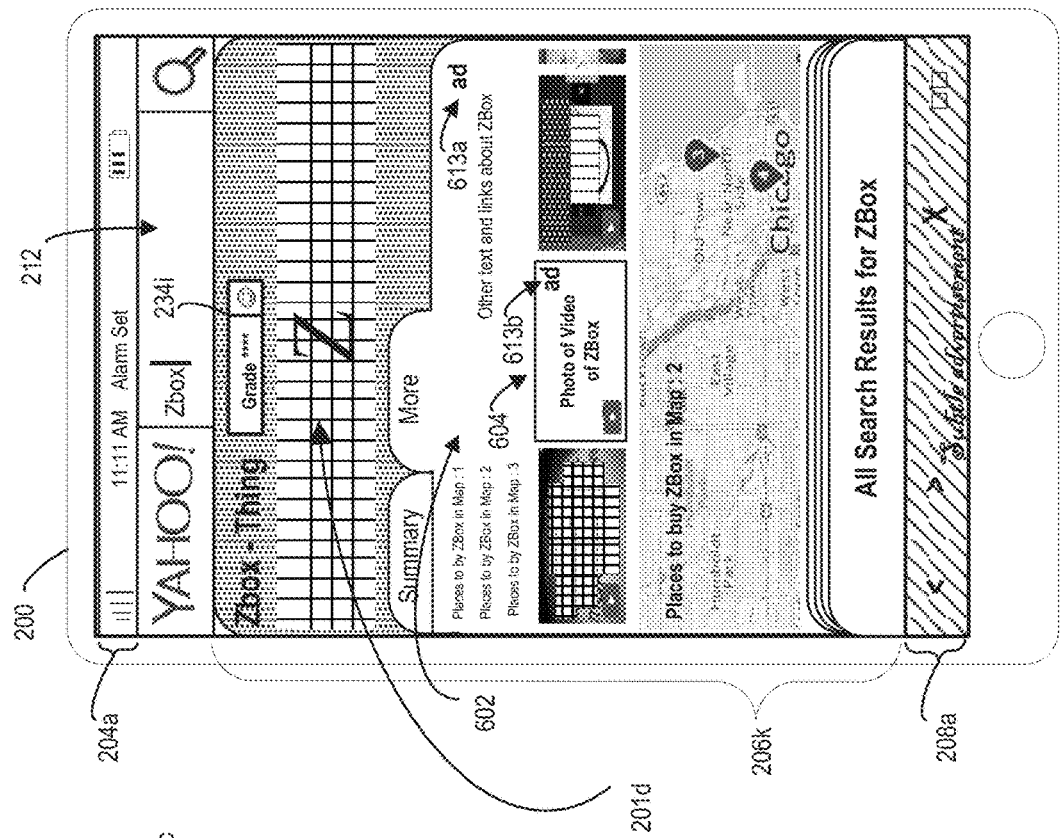
Figure 6A:
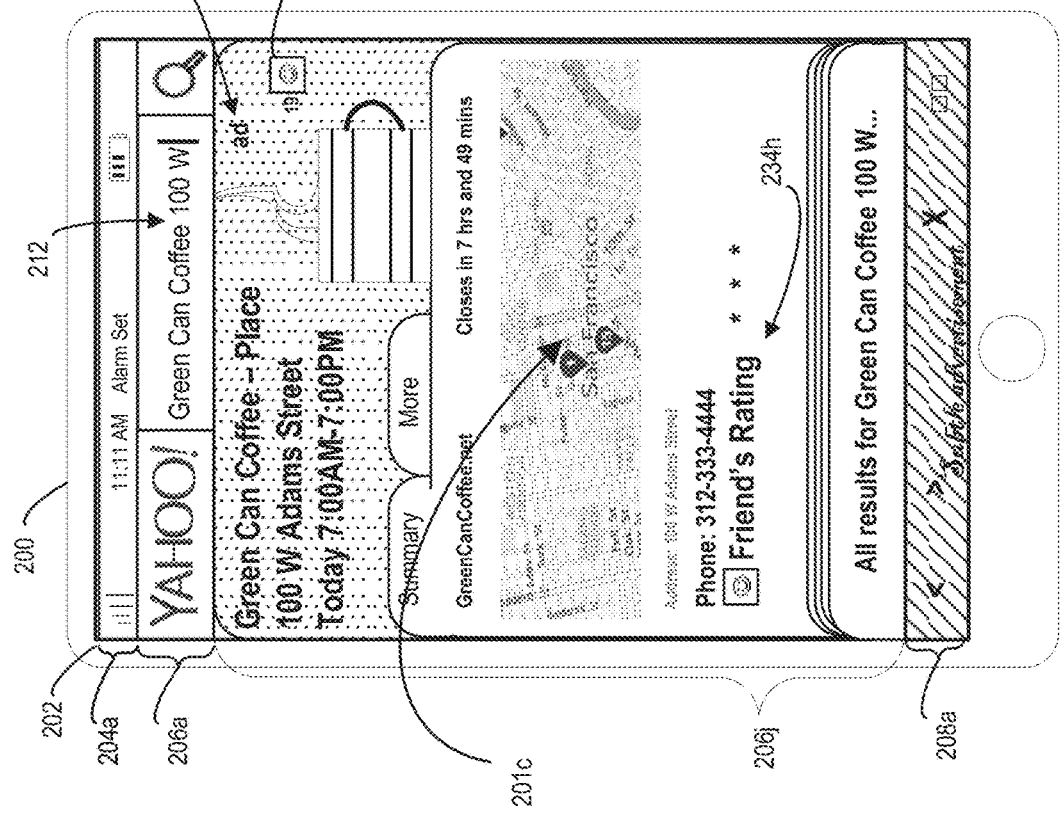
FIG. 6a illustrates an example expanded and displayed sponsored entity search result object associated with a place. Specifically, this depiction of the displayed object associated with a place includes a summary section rendered by respective circuitry of the modular search object framework.

Full-size entity cards, such as cards displayed for Green Can Coffee the thing (e.g., cards within sections 206c-206g in FIGS. 2b-4b), provide information specific to that entity or entities related to that entity. Besides a specific thing (such as a company), entities may include any particular person or place. For example, section 206j in FIG. 6a depicts a place entity card for the specific storefront location of Green Can Coffee. The full-size card in section 206j is labeled "Green Can Coffee—Place" followed by an address of the location. This distinguishes this Green Can Coffee the place from other entity modules for locations of Green Can Coffee storefronts. Section 206k in FIG. 6b depicts another thing entity (in particular, a product entity), for the entity Zbox. Sections 206h and 206i in FIGS. 5a and 5b, respectively, depict a person entity.

Various versions of Zbox may have their own full-size cards and entity trays, and although the depicted entity tray 201 in FIG. 6b is not sponsored other aspects within the tray are sponsored. For example, the "more" card or "more" GUI 602 is sponsored, which is indicated by the ad indicator 613a. The thumbnail image link 604 to a video of the Zbox is also sponsored, which is indicated by the ad indicator 613b. In this sense, there is an expansive hierarchy and network of entities, and each of the online presented entities and graphical elements within these entities may be sponsored and monetized.

Within the expansive hierarchy and network, people, places, and things may have various types of relationships. For example, these relationships may include object relationships such as from the perspective of an object hierarchy including relationships between generic items and specific items, such as Zbox in general and specific versions of Zbox. This object hierarchy applies to places as well. For example, Green Can Coffee, may be a thing (a company) in general, but each location of Green Can Coffee is a specific place. The generic thing can be related the specific places, and such relationships may be outputted for user navigation through associated links, such as links to specific locations of Green Can Coffee 406a and 406b in FIG. 4b. Parent object sponsorship can be associated with children objects so that children objects are sponsored as well. Although, children objects may be sponsored by different entities as well.

Referring back to FIG. 2b, depicted is a full-size card 226 for Green Can Coffee the thing. Within in the full-size card 226, there are many parts viewable and hidden. Overlapping the full-size card are two sub-cards 228a and 228b, a card labeled "summary" and a card labeled "more", respectively (hereinafter referred to as the summary card and the "more" card). These cards may be sponsored by the same entity that is sponsoring the entity tray 201a, as indicated by ad indicator 213. The full-size card 226 and the two sub-cards 228a and 228b are extended out from the deck of cards 210. Also, the deck of cards 210 is not sponsored independently, but may be sponsored by the same entity that is sponsoring the entity tray 201a, as indicated by ad indicator 213. Sub-cards of a deck of cards or the deck of cards itself may each be independently sponsored, although this is not the case in FIGS. 2a-6a.

The section 206c, which includes the deck of cards 210 and cards extended out from the deck, can also be referred to as an entity tray. The section 206b overlapped by the virtual keyboard 204b may also encompass a tray 203 for at least cards 216-224. A tray can be associated with at least a partially executed search query and/or an unexecuted search query. For example, section 206b may encompass a tray associated with unexecuted search queries including the search term "Green", such as search suggestions. Sections 206c-206g encompass a tray 201a associated with the searched entity, Green Can Coffee the thing, which is at least a partially executed search query.

In summary, section 206b encompasses the tray 203, which includes sponsored and non-sponsored search results and suggestions associated with text "Green" entered in search box 212. Sections 206c-206g encompass a tray 201a associated with the searched entity Green Can Coffee the thing. The entity tray 201a is sponsored as indicated by the ad indicator 213. Sections 206h and 206i encompass a tray 201b associated with the searched entity Katie Bolmes the actress. The entity tray 201b is sponsored as indicated by ad indicator 513 in FIG. 5a. Section 206j encompasses a tray 201c associated with the searched entity Green Can Coffee a place entity at a specific location of a Green Can Coffee storefront. The entity tray 201c is sponsored as indicated by ad indicator 613c in FIG. 6a. Section 206k encompasses a tray 201d associated with the searched entity, Zbox, a thing entity.

The content within entity tray, such as entity tray 201a, may be or include content dynamically resulting from individual sub-queries. In this sense, an entity tray can be a presentation of search results arranged in a more intuitive and pleasing manner than a mere list of search results. The searched results in an entity can be selectively arranged and presented in a manner similar to arrangements of content within a print or online textbook, magazine, newspaper, or any combination thereof; instead of arranged as a search results list. Also, such arrangements can have graphical themes, such as the illustrated card theme in FIGS. 2a-6b.

Also, within an entity tray, presentations associated with at least one module circuitry may appear. Each module has respectively circuitry configured to execute various aspects of the module. In FIG. 2b, depicted is a GUI rendered by an entity summary module. This summary GUI and other GUIs within the tray, can include searched and dynamically generated summary information regarding the selected entity. Also, through data feeds or information management tools, an entity managing the tray (such as the framework provider or sponsor of the tray) can select and supply information to the GUIs of the tray, such as office hours, business locations, phone numbers, recent promotions, coupons, application links to their applications at an online application store, and links of extended information such as ratings, reviews, check-in information, images, products sold, and the like. Also, parts of such information may be scraped or indexed and collected by a web crawler.

In FIG. 2b, the selected entity is Green Can Coffee the thing. The information that appears in the summary GUI may be scraped information, information retrieved from a web crawler and indexed, information from a content database, information selected by a party that is responsible for editing the information, information selected by machine learning, or any combination thereof. Such information may be mined by and/or from any one or more of the servers and databases illustrated in FIG. 1. Such information may include most sought out information for the selected entity. Most sought out information may be determined from online search logs and other logs pertaining to web browsing, by an analytics server (such as the analytics server 118). The information may be updated in various intervals. The length of time between updates may be based on an amount the entity summary is requested for the selected entity. The information within the entity summary may be plain text or hypertext that links to other entities or initiates a search related to the hypertext when the hypertext is selected. The information presented in the summary GUI may be sponsored, non-sponsored, or both. The summary module circuitry associated with the summary GUI may include sub-circuitry specific to sponsored aspects and non-sponsored aspects of the summary GUI. Also, the tray module circuitry associated with the control and display of trays may include sub-circuitry specific to sponsored aspects and non-sponsored aspects of entity trays.

Also, as illustrated in FIG. 2b, the summary information may include applications, such as widgets 234a and 234b. Widget 234a includes a stock ticker for Green Can Coffee (GCC). Widget 234b includes a link to an application that can locate Green Can Coffee storefronts. For example, a user may click on the widget 234b, which causes a transition from the summary GUI to an entity locator application GUI, such as a maps card 404 illustrated in FIG. 4b. The respective module circuitry associated to the control and display of each of these applications may include sub-circuitry specific to sponsored aspects and non-sponsored aspects of these applications. Additionally or alternatively, the summary information may include social media widgets and information, such as social media widget 234d of FIG. 2b and the information provided by the widget. The social media widget 234d may present what one or more of a user's friends think of the entity being summarized by the summary information.

Besides summary information including a widget other entity information and GUIs may include widgets, such as social media widgets. For example, the entity tray 201a includes social media widget 234c (see FIGS. 2a-4b), which presents the amount of friends linked to the user through social media that have viewed the entity tray of Green Can Coffee the thing. The entity tray 201b in FIGS. 5a and 5b has a similar widget 234f for Katie Bolmes the person. The entity tray 201c in FIG. 6a has a similar widget 234g, for Green Can Coffee the place at 100 W Adams Street. The entity tray 201d in FIG. 6b has a different type of social media widget, social media widget 234i, which presents a cumulative rating of all user ratings of the entity Zbox the thing, across one or more social media sources. Also, the entity tray 201c has a second social media ratings widget 234h. This widget has a cumulative rating of all ratings made by friends of the user for the Green Can Coffee at 100 W Adams Street, across one or more social media sources. Also, in FIG. 4b, the map in the map card 404 may include social media graphical elements as well. For example, on the map in the map card 404 indicating Green Can Coffee locations, the map also includes an indicator 234e of a restaurant that a friend of the user reviewed. In FIG. 3a, the miniature tray 318c is partially provided by a social media module circuit. In this sense, the miniature tray 318c may also be considered a social media widget presenting social media information, such as things the user's friends search that are related to Green Can Coffee.

Depicted in FIG. 2b, a theme may be rendered by an entity theme module circuit. The entity theme module circuitry may include visual and instrumental settings for the tray associated with the selected entity. For example, trays can look, feel, and operate differently. Such settings may include setting for the backdrop of the tray. A backdrop may include a photograph associated with the entity, such as a photograph including the entity, fitted to a section encompassing the tray. FIGS. 2b-4b show at least part of the backdrop 230 for the entity Green Can Coffee the thing. The backdrop 230 includes a label 232a for the entity Green Can Coffee the thing and a photo image associated with Green Can Coffee 232b. See FIG. 2b. Besides the tray for Green Can Coffee the thing, the search result card for Green Can Coffee the thing includes part of the backdrop 230 (See FIG. 2a). Also, the backdrop can be modified by the backdrop module circuitry. The theme module circuitry may include circuitry that supports visual schemes (such as color and texture schemes) for various aspects of the framework, including schemes for entity trays and sub-GUIs of entity trays. The theme module circuitry may include sub-circuitry specific to sponsored aspects and non-sponsored theme aspects of the framework. Also, the backdrop module circuitry may include sub-circuitry specific to sponsored aspects and non-sponsored aspects of the backdrop.

At the screen in FIG. 2b, a user can select the tab associated with the "more" card 228b. This may cause the tray for Green Can Coffee the thing to transition from the summary card 228a to the "more" card 228b. The displaying of the "more" card 228b is illustrated in FIG. 3a. The "more" card 228b includes a GUI rendered by a "more" module circuit. This "more" GUI includes information regarding the selected entity. As depicted, the information of the "more" GUI can be displayed through sub-GUIs associated with different categories and modules circuits associated with the different categories. Each sub-GUI can be rendered by one or more related module circuitry. The "more" module circuitry can include configuration information, such as presentation configuration information for the module and sub-modules within the module. For example, in the FIG. 3a, some sub-modules are presented as scrollable miniature trays 318a-318c with respective miniature cards displayed side-by-side. For example, in the touchscreen context miniature cards within a miniature tray can be cycled through by swiping the tray in a corresponding direction.

The "more" module circuitry can also include configuration information relevant to which sub-module GUIs to include with the "more" module GUI. For example, in FIG. 3a, at least sub-modules circuits for displaying nearest locations of Green Can Coffee storefronts, famous people that endorse Green Can Coffee, and other things search by people that search Green Can Coffee have been selected to be included with the "more" module circuitry for Green Can Coffee the thing. The "more" module circuitry for Green Can Coffee the thing can be a combination of the "more" module circuitry and entity circuitry for Green Can Coffee, in communication with each other. The selection of sub-module circuitry per module circuitry may be global across all entities, particular per entity type, particular per entity, or any combination thereof. For example, in the "more" module circuitry, the "nearest locations" module circuitry may be included across thing entities with storefronts. Whereas, for example, "images" module sub-GUI (as shown displayed in FIG. 3b as the sub-GUI 308) may be universally selected across all types of entities. The "Famous fans" module sub-GUI may be included just for the instance of the "more" module GUI for Green Can Coffee the thing or any other thing celebrity endorsers.

The "more" module circuitry may include circuitry that supports the "more" GUI and related control of the "more" module. The "more" module circuitry may include sub-circuitry specific to sponsored aspects and non-sponsored aspects of the "more" GUI and related control of the "more" module.

The selection of sub-modules GUIs may be based on various sources. For example, the sponsor of an entity module may select one or more of the sub-module GUIs per GUI of the entity tray. Additionally or alternatively, selected modules may be based on scraped online information, information retrieved from a web crawler and indexed, information from a content database, information selected by a party that is responsible for editing the corresponding entity tray, information selected by machine learning, or any combination thereof. Such information may be mined by and/or from any one or more of the servers and databases illustrated in FIG. 1. Such information may include most sought out information for the selected entity. The most sought out information may be related to most common categories searched along with queries for a particular entity. For example, search logs may show it is likely that the intent of users querying for information on Green Can Coffee are also looking for information on locations of Green Can Coffee storefronts. Also, as mentioned, an owner, such as an owner advertiser, associated with the Green Can Coffee, may manually select the sub-module GUIs to include with a particular module GUI, such as the "more" module GUI.

There are benefits to using machine learning to predict intentions of users querying an entity and using the predictions to select sub-modules for that module circuitry. Actually, various aspects of an entity tray may be determined based on such predicted intentions of users searching for the entity associated with the entity tray. For example, machine learning can be used to determine predicted information and information desired by the user to be displayed anywhere on an entity GUI. Such information can be determined according to historical online user interaction data that can include data pertaining to clicks, searches, dwell times, or any combination thereof. Respective module circuitry associated with such predictions may include respective specific circuitry for predictions with related to sponsored content and non-sponsored content.

In FIG. 3a, the selected entity is still Green Can Coffee the thing. The information that appears in the "more" GUI may be scraped information, information retrieved from a web crawler and indexed, information from a content database, information selected by a party that is responsible for editing the information, information selected by machine learning, or any combination thereof. Such information may be mined by and/or from any one or more of the servers and databases illustrated in FIG. 1. Such information may include most sought out categorical information and detailed information pertaining to each category for the entity. This most sought out information may be determined from online search logs and other logs pertaining to web browsing, by an analytics server (such as the analytics server 118). The categorical information and the detailed information may be updated in various intervals. The length of time between updates to each sub-GUI may be based on an amount that sub-GUI is requested for the selected entity. The information within the entity GUIs may be images and/or text and may include hyperlinks to other entities or hyperlinks that initiate related searches. For example, a user may select one of the storefront location images in the entity location indicator 301, and this may initiate a search with respect to the selected storefront or navigation to an entity tray for that storefront if it exists within the framework, such as the entity tray 201c in FIG. 6a.

Also, as depicted, a user may select one of the image based links in the "famous fans" sub-GUI 303 or the "things search by your friends that you may like" sub-GUI 305, and this may initiate a search with respect to the selected link or navigation to an entity tray linked to the selected image based link. The links in the sub-GUI 305 may be provided by social media sources. For example, a user may select one of the images associated with one of the endorsers of Green Can Coffee, such as the image labeled "Katie Bolmes" 302 that includes an ad indicator 313b. This may cause the GUI of the framework to swap out the tray 201a for Green Can Coffee the thing with the tray 201b illustrated in FIGS. 5a and 5b for Katie Bolmes the actress. FIG. 5a includes a summary card for Katie Bolmes the actress rendered on the backdrop of the tray 201b. In an example of the framework, the default landing page or sub-card of a tray is the summary GUI. Also, depicted in FIG. 5a is a change in the label of the deck of cards to "All search results for Katie Bolmes" instead of "All search results for Green Can Coffee". Also, the text in the search box 212 may be changed automatically to text associated with the destination entity. In this case, the navigation from the Green Can Coffee tray 201a to the Katie Bolmes tray 201b causes a change in the label on the deck of cards and a change of the text in the search box to text including Katie Bolmes.

In FIG. 5b, a text string "Favorite Color" has been entered into the search box along with "Katie Bolmes". This additional text may be predicted to be a question associated with entity predicted for the search text. In this case, the framework is predicting, through a question prediction module, that the user is interested in the favorite color of Katie Bolmes the actress. The question prediction module circuitry may be coupled with question answering module circuitry configured to search out an answer to the predicted question. In FIG. 5b, it is shown that the question answering module circuitry is configured to output an answer 502 to a position for answers 504 at the top of the summary card for Katie Bolmes. The question prediction module circuitry may include sub-circuitry specific to sponsored aspects and non-sponsored aspects associated with question prediction in the framework. The question answering module circuitry may include sub-circuitry specific to sponsored aspects and non-sponsored aspects associated with question answering in the framework. As it is depicted in FIG. 5b, the position for answers 504 is sponsored. Where the position for answers is sponsored, the area of the position may take on graphical themes and elements associated with the sponsor.

Referring back to FIG. 3a, a user may select the deck of cards 210, such as by clicking on or swiping upwards beginning at the text "All search Results for Green Can Coffee". This may cause the tray 201a for Green Can Coffee the thing to transition from the "more" card 228b to the "all search results" card 304 in FIG. 3b. The displaying of the "all search results" card 304 is illustrated in FIG. 3b. The "all search results" card 304 includes a GUI rendered by an "all search results" module circuitry. This "all search results" GUI includes information regarding the selected entity. As depicted, information of the "all search results" GUI can be displayed through sub-GUIs associated with different categories, and module circuitry associated with the different categories. Each sub-GUI can be rendered by one or more related module circuitry. The "all search results" module circuitry can include configuration information, such as presentation configuration information for the module circuitry and sub-modules within the module circuitry. For example, in the FIG. 3b, the images sub-GUI is presented as a scrollable miniature tray with respective miniature cards displayed side-by-side, each card including an image of the entity associated with the tray 201a for Green Can Coffee the thing. The "webpage results" sub-module is presented as a scrollable miniature tray with a listing of webpage based search results. These search results may be clickable to navigate to a corresponding webpage or another card associated with the entity tray. In FIG. 3b, depicted is a user's finger 306 gesturing over the webpage search results provided by the webpage results sub-module circuitry. Upon such a gesture, sections 208a and 206a have been hidden to allow more screen space to display the webpage search results.

The "all search results" module can also include configuration information relevant to which sub-modules to include with the "all search results" module. For example, in FIG. 3b, at least sub-modules for webpage search results and image search results have been selected to be included with the "all search results" module for Green Can Coffee the thing. As mentioned, the selection of sub-modules per module may be global across all entities, particular per entity type, particular per entity, or any combination thereof. For example, in the "all search results" module, the "images" module may be included across people and thing entities but not places entities. Whereas, for example, "webpage results" module (as shown displayed in FIG. 3b as the sub-GUI 310) may be universally selected across all types of entities for the "all search results" module. It should be noted for the "all search results" module circuitry as well as other module circuitry with GUIs depicted herein, that associated sub-GUIs may be hidden from the illustrated views, but may become viewable upon scrolling through respective sections.

Also, the "all search results" module circuitry may include circuitry that supports the "all search results" GUI and related control of the "all search results" module. The "all search results" module circuitry may include sub-circuitry specific to sponsored aspects and non-sponsored aspects of the "all search results" GUI and related control of the "all search results" module.

Figures 4A, 4B:
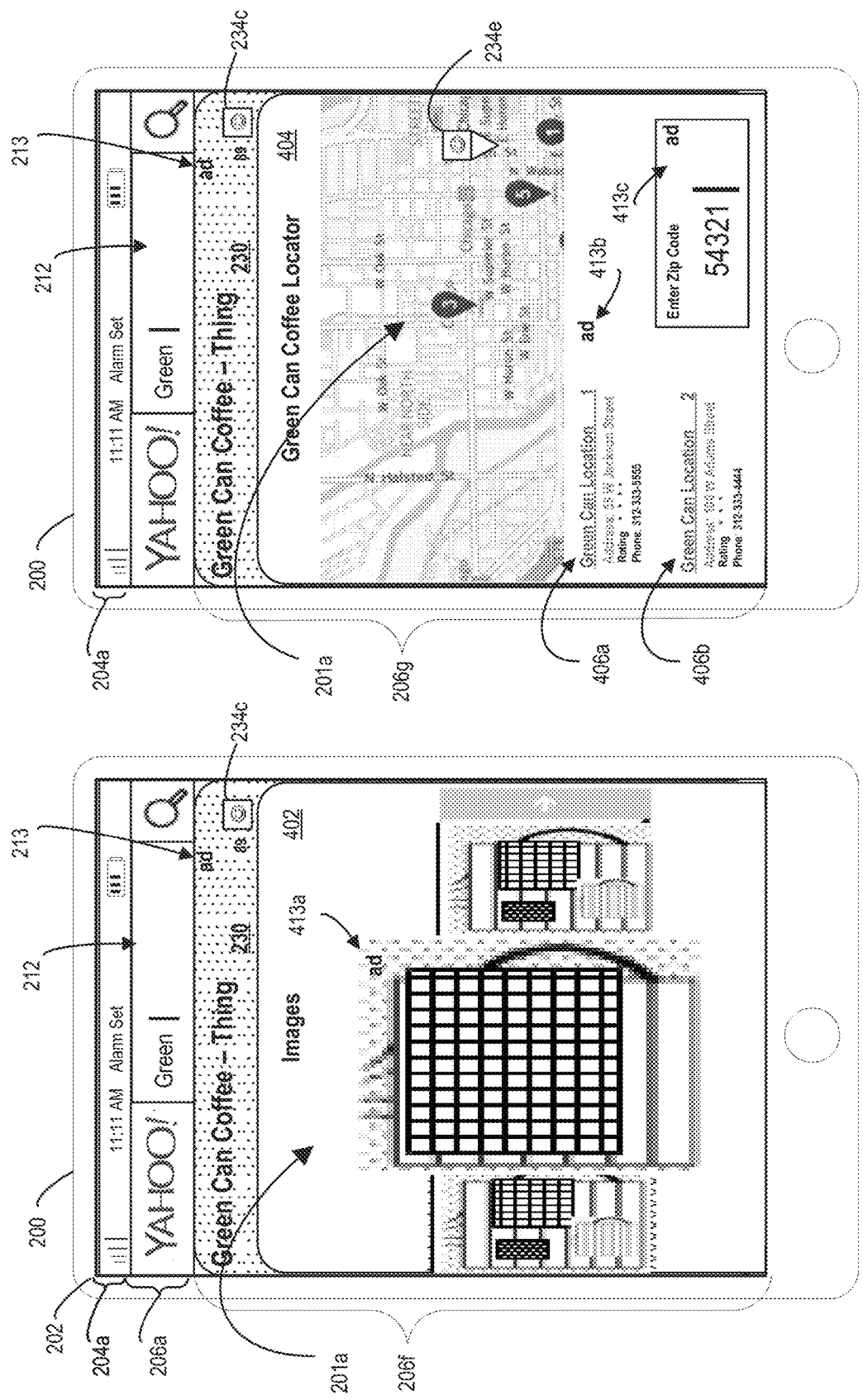
FIG. 4a illustrates the example displayed entity search result object of FIG. 2b overlapped by an example image based search results section rendered by respective circuitry of the modular search object framework.
FIG. 4b illustrates the example displayed entity search result object of FIG. 2b overlapped by an example map based search results section rendered by respective circuitry of the modular search object framework.

In FIG. 3b, the selected entity is still Green Can Coffee the thing, and a user may select a link, such as image link 312 or text link 314. Selecting a link, such as image link 312, may cause the client-side application to navigate to a webpage associated with a website hosting the corresponding image. Alternatively, it may cause the client-side application to navigate to a card within the tray of the entity, such as a card 402 for an image slideshow module (as depicted in FIG. 4a). As illustrated in FIG. 4a, images within the image slideshow may be sponsored (e.g., see image indicator 413a). Selecting a text link, such as text link 314, may cause the client-side application to navigate to a webpage corresponding with that link. Alternatively, selecting a text link, such as text link 314, may cause the client-side application to navigate to a card, such as the maps card 404 within the tray of the entity (as depicted in FIG. 4b). The maps card or similar framework interfaces may be labeled according to the context associated with the entity. For example, since Green Can Coffee has storefronts, the map card for this entity is labeled "Green Can Coffee Locator". In FIG. 6b, the depicted map is labeled "places to buy Zbox", since Zbox is a product. The information within GUIs of the framework may be images and/or text and may include hyperlinks to other cards within the entity tray, other entities, or may initiate related searches. All or any of which may be sponsored.

In FIG. 4b, the maps card 404 marks locations of Green Can Coffee storefronts. The map can be adjusted and maneuvered to find additional locations not first presented by the map. Below the map is a list of the locations identified on the map. In the list, a location may be sponsored, such as indicated by the ad indicator 413b. Other aspects of the map card may also be sponsored, such as the zip code entry tool (see the ad indicator 413c). When a user enters a zip code into the tool the map card may refresh with locations of the entity within that zip code. Tools, such as the zip code entry tool may be universal across most entities for certain sub-GUIs and may have one or a set of rotating sponsors. For example, the provider of the network could target navigation technology companies for sponsorship of the zip code tool across the framework.

In the list of locations on the maps card 404, links to places entities may be presented, such as links 406a and 406b. For example, a user may select one of the links associated with a place entity for Green Can Coffee at a particular storefront, such as link 406b. This may cause the GUI of the framework to swap out the tray 201a for Green Can Coffee the thing with the tray 201c illustrated in FIG. 6a for Green Can Coffee the place at a specific location (e.g., see entity tray 201c, which is labeled "Green Can Coffee the storefront at 100 W Adams Street"). FIG. 6a includes a summary card for the specific storefront of Green Can Coffee, which includes, with respect to the particular location, an indication of its location on a map, its address, amount of time until closing, an overall rating of the place by customers, and a phone number. The backdrop includes the label for the entity, its address, and hours open.

Referring back to FIG. 3b, the information that appears in the "all search results" GUI may be scraped information, information retrieved from a web crawler and indexed, information from a content database, information selected by a party that is responsible for editing the information, information selected by machine learning, or any combination thereof. Such information may be mined by and/or from any one or more of the servers and databases illustrated in FIG. 1. Also, the search results displayed by the "all search results" GUI may be determined by various known and foreseeable search engine algorithms. The search results may include most sought out information for the selected entity per category associated with the presented sub-GUIs. This most sought out information may be determined from online search logs and other logs pertaining to web browsing, by an analytics server (such as the analytics server 118). The categorical information and the search results may be updated in various intervals. The length of time between updates to each search result sub-GUI may be based on an amount that sub-GUI is requested for the selected entity.

To navigate back from card 402 in FIG. 4a or card 404 in FIG. 4b, a user may make a certain gesture towards the section 206f or 206g, respectively. In one example, a user may swipe downward starting at the top of the card to move that card downward, showing the sections of the tray 201a that have been overlapped by the card. For example, using a gesture to move down the card 402, may cause the presentation illustrated in FIG. 2b, FIG. 3a, or any other previously displayed card for that entity, such as the last card displayed for that entity prior to the card being moved downward. In other words, this functionality may act similar to a back button. To navigate to a new entity, the user may select a link to another entity or enter a new query in the search box 212 along with other actions. For example, upon entering text in the search box 212, the framework may cause the client device 200 to display search suggestions and/or search results similar to those depicted in section 206b of FIG. 2a except the suggestions and/or results pertain to the newly entered text. Then a user may select another entity from the listing.

Figure 7:
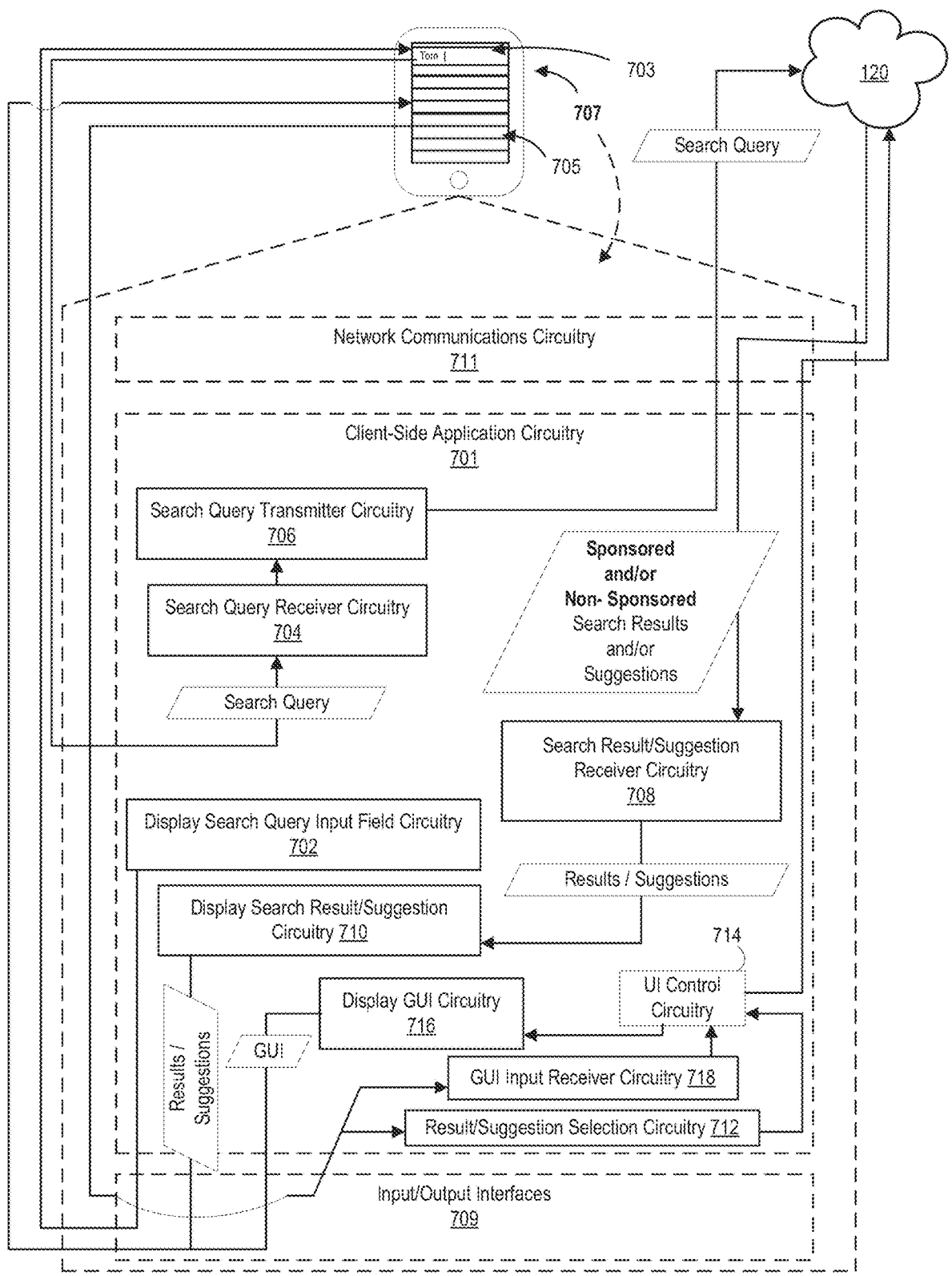
FIG. 7 illustrates a block diagram of example circuitry of a client device of an example system that can provide aspects of the module search object framework, such as any client device of the system illustrated in FIG. 1.
Figure 8:
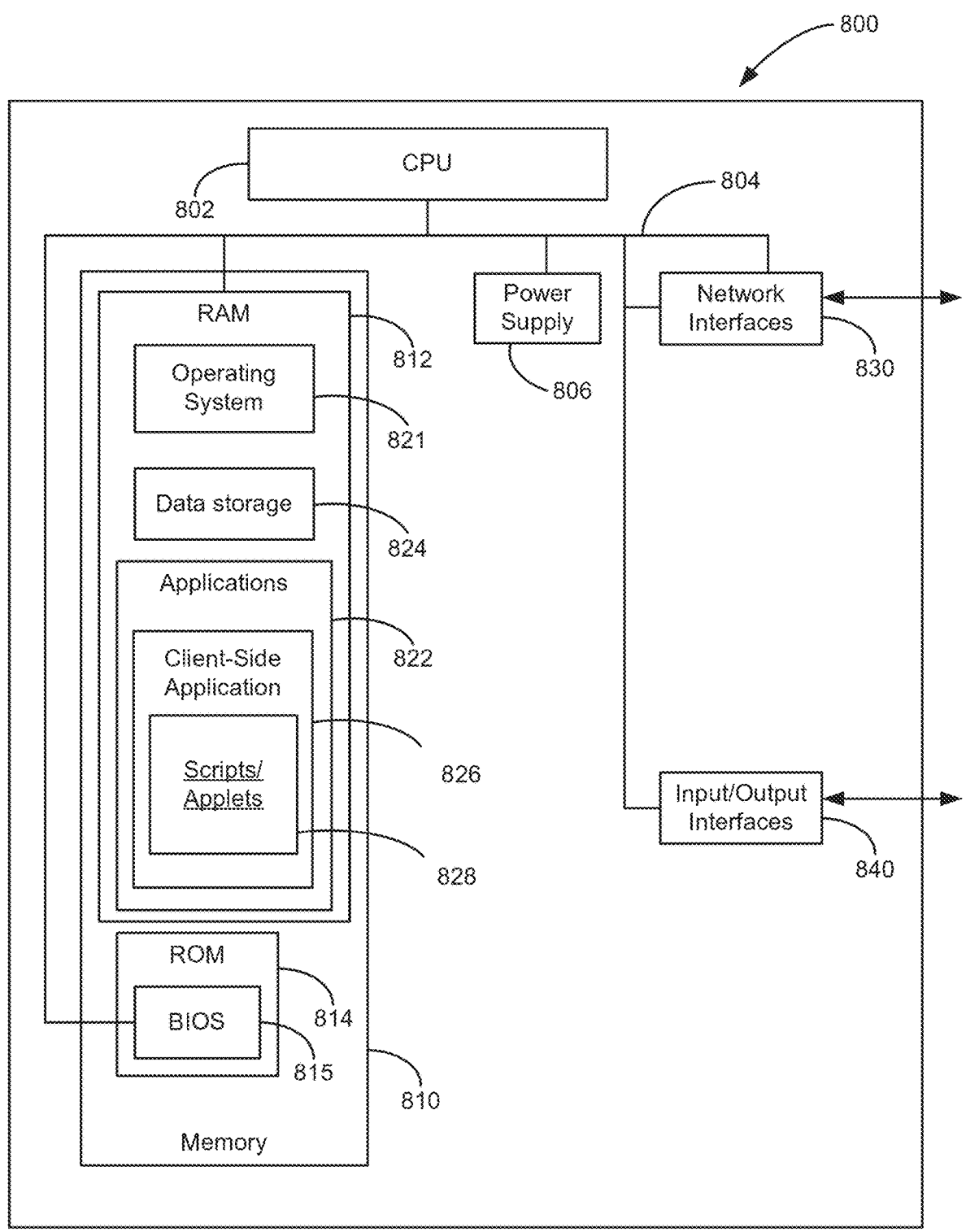
FIGS. 8 and 10 are block diagrams of example electronic devices that can implement aspects of and are related to the example system that can provide a modular search object framework. For example.

FIG. 7 illustrates a block diagram of example circuitry of a client device of an example system that can provide aspects of the module search object framework, such as any client device of the system illustrated in FIGS. 1 and 8. For example, FIG. 7 illustrates a block diagram of example circuitry of a client device 707 that can provide sponsored and non-sponsored entity search results, sponsored and non-sponsored non-entity search results, and sponsored and non-sponsored search suggestions within a section of a page view at least partially provided by a client-side aspect of the framework. The circuitry within the client device 707 can be part of and/or associated with a non-transitory medium executable by a processor of the client device. The circuitry can include input/output interfaces 709 (such as the input/output interfaces 840 of FIG. 8). The circuitry can also include client-side application circuitry 701 (such as circuitry of the client-side application 826 of FIG. 8). The circuitry can also include network communications circuitry 711 (such as network interfaces 830 of FIG. 8).

The client-side application circuitry 701 can include first circuitry 704 configured to receive a search query from a search query input field 703 of the page view. Also, the client-side application can include circuitry 702 configured to display the search query input field. The search query can be inputted by a user via the search query input field 703 and a user input device (such as a user input device of the input/output interfaces 709). For example, input and output may be received via a touchscreen 705. The search query can include text, an image, a voice command, a gesture (such as a gesture from a user's eye, head, torso, arm, hand, finger or any combination thereof), or any combination thereof. The receiving of the search query can occur at a placeholder within a non-transient computer readable medium, such as a reserved memory slot for that placeholder in a memory device of the client device 707. The search query can be manifested in the computer readable medium by a physical state change at the placeholder within the medium.

The client-side application circuitry 701 can also include second circuitry 706 configured to communicate the search query to a search server (such as search engine server 106 of FIG. 1, a sponsored search server, and/or the modular search framework server 116) over a network (such as the network 120). The communicating of the search query can occur by a communications interface embedded or connected to the client device, such as a communications interface of the network communications circuitry 711. The communications interface can transform the changed physical state of the medium, which represents the search query, to an electromagnetic signal of any type for communications across a computer network link. The communications interface can be communicatively coupled to the non-transient computer readable medium and the search server. The search server and the client device 707 can be one or more computers connected over the network 120. The aforementioned communicative couplings and other such couplings described herein can be implemented by various types of wired and wireless connections. The communications across the couplings can be via any form of electromagnetic signal, such as an electrical signal, an optical signal, or any combination thereof. Also, in an example, the search server can be the search engine server 106, a sponsored search server, the modular search framework server 116, or any combination thereof.

The search query can be communicated with user information, wherein the user information includes demographic information associated with the user, psychographic information associated with the user, a real time geographic location of the user, or any combination thereof. The search query can be communicated over a network that is part of a cloud computing environment. The search server can also be part of the cloud computing environment. The search server can be communicatively coupled to a content server, an ad server, an analytics server, an account server, a sponsored search server, or any combination thereof (such any one or more of the servers of FIG. 1). Any of these parts may be part of the cloud computing environment.

The client-side application circuitry 701 can also include third circuitry 708 configured to receive entity and non-entity search results, such as entity and non-entity sponsored search results, from the search server according to the search query. This circuitry may also receive search suggestions from the server, such as sponsored search suggestions. Additionally or alternatively, search suggestions may be generated by a client-side circuit, such as by circuitry associated with the scripts and/or applets 828 in FIG. 8. The receiving of the search result can occur by a communications interface embedded or connected to the client device, such as a communications interface of the network communications circuitry 711. The communications interface can transform an electromagnetic signal that represents the sponsored search into changed physical state of the non-transitory computer readable medium that represents the search result.

A search result can be determined at the search server according to the search query. This determination can be done by a non-entity or entity non-sponsored search results determiner circuitry and/or a non-entity or entity sponsored search results determiner circuitry hosted by the search server. A search result can also be determined according to the user information. The search result can also be determined from data from the content server, the ad server, the analytics server, the account server, the sponsored search server, or any combination thereof (such as any one or more of the servers of FIG. 1). The search result can include instructions associated with a sub-GUI that can extend out from, overlap, or both, a respective set of search results, such as illustrated in FIGS. 2*a*-6*b*. The instructions associated with the sub-GUI are hidden from view of the user, such as in the form of web browser readable and/or executable code.

The client-side application circuitry 701 can also include fourth circuitry 710 configured to display the entity and/or non-entity search results on the page view (such as the entity search results 220-224 and the non-entity search result 216 in FIG. 2*a*). In such examples, a sponsored search result can be displayed first in a list of displayed search results. Also, the sponsored search result can abut a non-sponsored search result.

The displaying of the search result on a page view can occur on a display device of the touchscreen 705 already displaying the page view, wherein the display device is either embedded or connected to the client device 707. A graphics card or any other type of graphics processing device can transform the part of the computer readable medium representing the search result into an electromagnetic signal representing the sponsored search that can be communicated to the display device. At this point, the signal is rendered into a visual presentation by the display device. Any one of these technical functions can be implanted via an output device (such as an output device of the input/output interfaces 709) of the touchscreen 705.

The client-side application circuitry 701 can also include fifth circuitry 712 configured to receive a selection of a part of the search result or search suggestion. When a selection is for an entity search result, such as a sponsored entity search result, that selection can cause the displaying of an entity GUI and sub-GUIs. The receiving of the selection can occur at a placeholder within a non-transient computer readable medium, such as a reserved memory for that placeholder in a memory device of the client device 707. The selection can be manifested in the computer readable medium by a physical state change at the placeholder within the medium. The selection can be inputted by a user via an icon selection input field and a user input device (such as a user input device of the input/output interfaces 709). The selection can occur by a user clicking on, moving over, or touching a search result. The selection may occur by a tactile input, a voice command, a gesture (such as a gesture from a user's eye, head, torso, arm, hand, finger or any combination thereof), or any combination thereof.

The client-side application circuitry 701 can also include sixth circuitry 716 configured to display a GUI and/or sub-GUI associated with the search result (or a search suggestion). The displaying of the sub-GUI can occur in the same page view. The user interface can be proximate to the selected search result icon. The user interface can be within the same section of the search result. The user interface can abut the search result. The user interface can be immediately below the search result. The user interface can be immediately above the search result. The user interface can be immediately to a side of the search result. The user interface can be immediately kitty-corner of the search result. The user interface can be within a list of search results so that the user interface occurs below or above the search result and above or below, respectively, a search result initially below or above the search result. The search result initially below or above the search result could have been immediately below or above the search result. The displaying of the GUI or sub-GUI may cause the search result, which is immediately above or below the other search result, to move up or down according to the positioning of the GUI or the sub-GUI. This functionality is especially useful in the case of a sponsored search result.

The GUI or sub-GUI can present audio content, video content, textual content, graphical content, tactile content, any other type of human perceivable content, a web form, a video game, a link to a second page view, or any combination thereof. The GUI or sub-GUI can be displayed on or over the entire page view. The GUI or sub-GUI can be displayed on or over a majority of the page view. The sub-GUI can be displayed on or over a majority or the entirety of a page section containing the search result. In examples, where the GUI or the sub-GUI is displayed over a part of the page view, at least part of the GUI or sub-GUI can at least be partially transparent. In other examples, the one or more parts besides the user interface can be suppressed visually when the GUI or sub-GUI is displayed. The visual suppression can include blurring, reduction in size, reduction in brightness, reduction in sharpness, pixelization, filtering out one or more colors, or any combination thereof. These features can be modified to emphasize sponsored results and suggestions over non-sponsored results and suggestions, and emphasize sponsored entity GUIs over non-sponsored entity GUIs.

Examples of GUIs and sub-GUIs and their transitions are shown in FIGS. 2*a*-6*b*. Features of transitions can also be modified to emphasize sponsored transitions over non-sponsored transitions. A graphics card or any other type of graphics processing device can transform the part of the computer readable medium representing the GUI or sub-GUI into an electromagnetic signal representing the GUI or sub-GUI that can be communicated to the display device. At this point, the signal is rendered into a visual presentation by the display device. Any one of these technical functions can be implanted via an output device (such as an output device of the input/output interfaces 709).

The client-side application circuitry 701 can also include seventh circuitry 718 configured to receive a user input from a user input field of the GUI or sub-GUI. The receiving of the user input from the user input field of the GUI or sub-GUI can occur at a placeholder within a non-transient computer readable medium. Also, the receiving of the user input or any other receiving of user input described herein can occur via various known ways of receiving user input, such as the ways described herein. For example, the user input for the GUI or sub-GUI can be received and processed via a user input device (such as a user input device of the input/output interfaces 709). The user input can include text, an image, a voice command, a gesture (such as a gesture from a user's eye, head, torso, arm, hand, finger or any combination thereof), or any combination thereof.

The user input field can include a text box with one or more lines for entering text, a check box, radio button, a file select control for uploading a file, a reset button, a submit button, a drop-down list, a scrollable list, or any combination thereof. The user input field can also include a selectable image, an animated image, a fixed image, or any combination thereof. The user input field can be presented according to the search query, demographic information associated with the user, psychographic information associated with the user, a real time geographic location of the user, or any combination thereof.

The client-side application circuitry 701 can also include eighth circuitry 714 configured to initiate an action according to the received user input from the user input field of the GUI or sub-GUI. Aspects and features of and related to the action may be sponsored and/or monetized. The action can be manifested by one or more computer parts described herein, network parts described herein, any other known computer hardware, any other known computer software, and any combination thereof. For example, an action that occurs usually on the client-side can be implemented by a part of the client device 707. An action that occurs usually on the server-side can be implemented by a part of one of the servers described herein, such as the servers described with respect to FIG. 1.

The action can include displaying one or more sponsored GUIs or sub-GUIs and/or one or more non-sponsored GUIs or sub-GUIs, which can include or be associated with audio content, video content, textual content, graphical content, tactile content, any other type of human perceivable content, a web form, a user input field, a link to a another GUI or sub-GUI, such as one of another entity, a change to a state of a user input field (such as a location of the field, a size of the field, coloring of the field, brightness of the field, shape of the field, or another type of graphical makeup of the field, or any combination thereof), or any combination thereof. The action can include submission of the user input to a server. Such a submission can be used towards a transaction, such as a commercial transaction associated with sponsored content. The submission can be stored in a database. Also, the submission can be used to determine at least part of the displaying of the GUIs and sub-GUIs (in other words, the submission can be used as feedback).

FIG. 8 is a block diagram of an example electronic device 800 that can implement client-side aspects of and related to aspects of the framework. For example, the electronic device 800 can be any of the client devices described with respect to FIGS. 1 and 7, such as the audience client device 124. The electronic device 800 can include a central processing unit (CPU) 802, memory 810, a power supply 806, and input/output components, such as network interfaces 830 and input/output interfaces 840, and a communication bus 804 that connects the aforementioned elements of the electronic device. The network interfaces 830 can include a receiver and a transmitter (or a transceiver), and an antenna for wireless communications. The CPU 802 can be any type of data processing device, such as a central processing unit (CPU). Also, for example, the CPU 802 can be central processing logic; central processing logic may include hardware (such as circuits and/or microprocessors), firmware, software and/or combinations of each to perform functions or actions, and/or to cause a function or action from another component. Also, central processing logic may include a software controlled microprocessor, discrete logic such as an application specific integrated circuit (ASIC), a programmable/programmed logic device, memory device containing instructions, or the like, or combinational logic embodied in hardware. Also, logic may also be fully embodied as software.

The memory 810, which can include random access memory (RAM) 812 or read-only memory (ROM) 814, can be enabled by memory devices, such as a primary (directly accessible by the CPU) and/or a secondary (indirectly accessible by the CPU) storage device (such as flash memory, magnetic disk, optical disk).

The RAM 812 can store data and instructions defining an operating system 821, data storage 824, and applications 822, including the client-side application 826 and the scripts and/or applets 828 (such as scripts and/or applets adapted for framework client-side functions). The applications 822 may include hardware (such as circuits and/or microprocessors), firmware, software, or any combination thereof. Example content provided by an application, such as the client-side application 826, may include text, images, audio, video, or the like, which may be processed in the form of physical signals, such as electrical signals, for example, or may be stored in memory, as physical states, for example.

The ROM 814 can include basic input/output system (BIOS) 815 of the electronic device 800. The power supply 806 contains power components, and facilitates supply and management of power to the electronic device 800. The input/output components can include various types of interfaces for facilitating communication between components of the electronic device 800, components of external devices (such as components of other devices of the information system 100), and end users. For example, such components can include a network card that is an integration of a receiver, a transmitter, and I/O interfaces, such as input/output interfaces 840. A network card, for example, can facilitate wired or wireless communication with other devices of a network. In cases of wireless communication, an antenna can facilitate such communication. The I/O components, such as I/O interfaces 840, can include user interfaces such as monitors, keyboards, touchscreens, microphones, and speakers. Further, some of the I/O components, such as I/O interfaces 840, and the bus 804 can facilitate communication between components of the electronic device 800, and can ease processing performed by the CPU 802.

Figure 9:
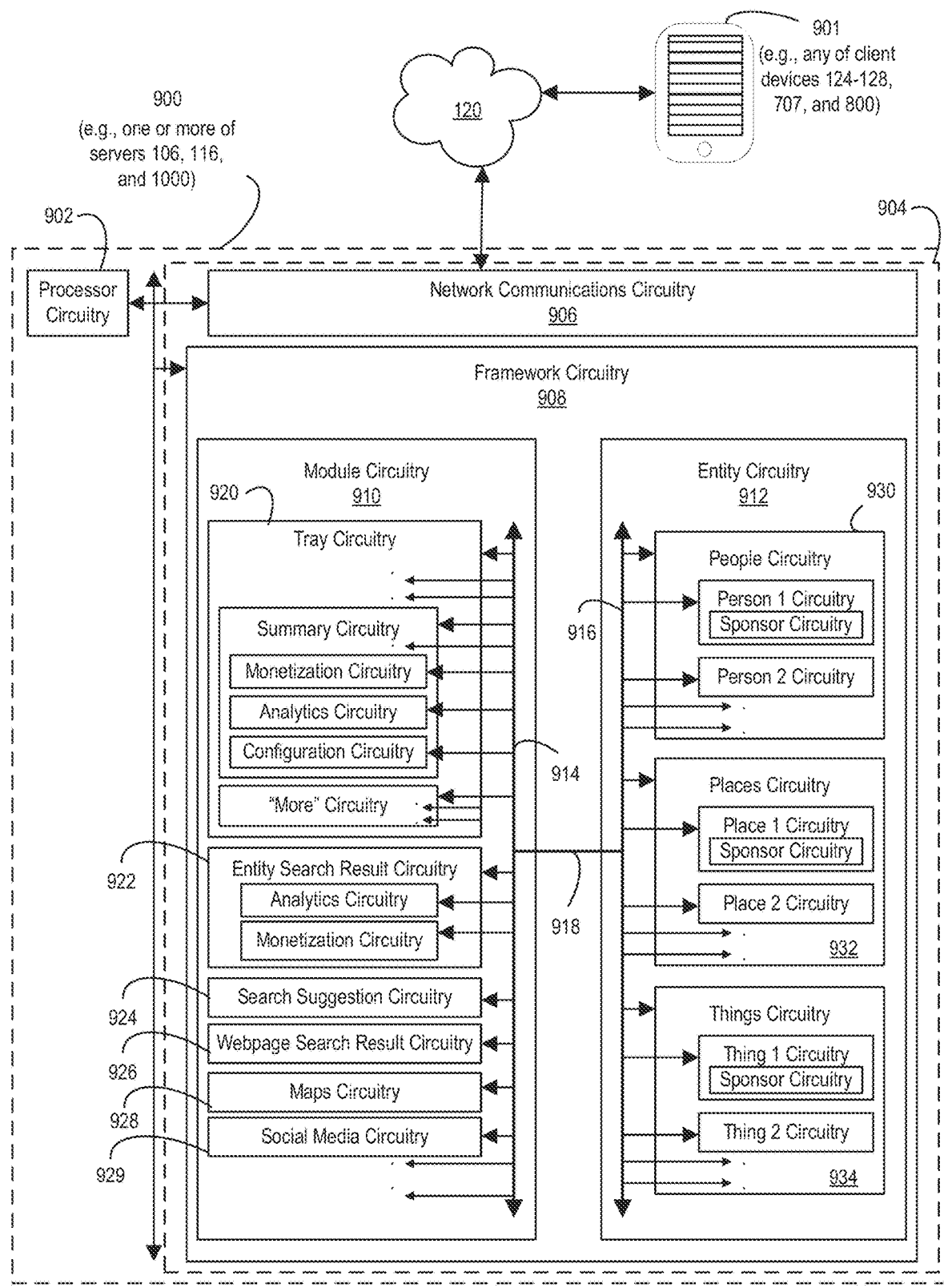
FIG. 9 illustrates a block diagram of example circuitry of a server of an example system that can provide aspects of the module search object framework, such as a modular search framework server 116 illustrated in FIG. 1.

FIG. 9 illustrates a block diagram of example circuitry of a server of an example system that can provide aspects of the module search object framework, such as the modular search framework server 116 illustrated in FIG. 1. FIG. 9 also shows a client device 901 (such as any of the client devices 124-128 of FIG. 1, device 707 of FIG. 7, or device 800 of FIG. 8) communicatively coupled to a server 900, over the network 120. In an example, the server 900 may include one or more servers, such as the modular search framework server 116, the search engine server 106, the server 1000 in FIG. 10, or any combination thereof.

The server 900 includes processor circuitry 902 (such as central processing unit 1002 of FIG. 10) and a system stored in a non-transitory medium 904 (such as memory 1010) executable by the processor circuitry. The system is configured to provide several aspects of the framework.

The system includes network communications circuitry 906 (such as circuitry included in the network interfaces 1030) and framework circuitry 908 (such as circuitry included in the modular search object framework 1026). The network communications circuitry 906 and the framework circuitry are communicatively coupled by circuitry. In this disclosure, circuitry may include circuits connected wirelessly as well as circuits connected by hardware, such as wires. The network communications circuitry 906 may be configured to communicatively couple the system to the client device 901 over the network 120. This for example allows an entity section provided by the server 900 to be displayed by a client-side application installed on the client device 901.

The framework circuitry 908 includes module circuitry 910 (such as module circuitry 1027a), entity circuitry 912 (such as entity circuitry 1027b), inter-module interface circuitry 914, inter-entity interface circuitry 916, and inter-framework interface circuitry 918. The inter-module interface circuitry 914 may be configured to communicatively couple any module circuitry of the module circuitry 910. For example, this circuitry 914 may at least communicatively couple entity GUI module circuitry, such as tray module circuitry 920, to one or more other circuitry of the module circuitry 910.

The inter-framework interface circuitry 918 may be configured to communicatively couple at least one entity circuitry of the entity circuitry 912 to any one of the plurality of module circuitry in the module circuitry 910, such as coupling any one of the entity circuitry to the tray module circuitry 920. For the example sections illustrated in FIGS. 2b-6b, the tray module circuitry may be configured to interact with the at least one entity circuitry to output an interactive entity section to a page view for a corresponding entity. Also, in such an example, the interactive section may include a plurality of moveable visual objects with information relevant to the corresponding entity. Also, in such an example, the plurality of moveable visual objects may be moveable within the interactive entity section. These functions can be implemented via the interoperating of the sub-circuitry of the module circuitry 910 and the entity circuitry 912.

Also, these moveable objects and associated functionality can be provided by any type of module circuitry and entity circuitry interoperating by the coupling provided by the inter-framework interface circuitry 918. In an example, the moveable visual objects may be cards. Also, the cards may have rounded corners as depicted in FIG. 2a-6b. A card of such cards may include a miniature tray of miniature cards within the card, and the miniature cards may include information relevant to the entity, as depicted in FIG. 3a. Also, the moveable object may include links for navigation between entities, and such objects may be overlapping, such as where a first overlapping object is moveable to view at least part of a second object beneath the first object. Also, the moveable visual objects may be adjacent to or abutting one other object of the moveable objects. These functions can be implemented via the interoperating of the sub-circuitry of the module circuitry 910 and the entity circuitry 912.

Also, beneficial functionality, such as movement by an object of the plurality of moveable objects being seamless without unintentional visual artifacts, can be due to close coupling of the circuitry of the framework circuitry 908. Additionally, close coupling between client-side circuitry of the framework circuitry installed on the client device 901 and native operating system circuitry of the client device, circuitry of a client-side application installed on the client device, or both, can improve such beneficial functionality as well. Code can be communicated from the server 900 to the client device 901, which provides addition to and configuration of the client-side circuitry of the framework circuitry for the client device. For example, circuitry within client device 707 of FIG. 7 may be added to or altered according to such code communicated from the server 900. The code may include objects representative of part of the framework circuitry 908.

The inter-entity interface circuitry 916 may be configured to communicatively couple at least one of the plurality of entity circuitry to one or more other of the plurality of entity circuitry, of the entity circuitry 912. The inter-entity interface circuitry 916 is communicatively coupled to the inter-module interface circuitry 914 by the inter-framework interface circuitry 918. These interconnections can provide a basis for the linking between entities as illustrated in FIGS. 2a-6b and corresponding text, and associating certain module GUIs with certain entities.

The module circuitry 910 can include at least one module circuitry, such as the tray module circuitry 920. Other examples of module circuitry within the module circuitry 910 can include entity search result circuitry, search suggestion circuitry 924, non-entity search result circuitry (such as webpage search result circuitry), maps circuitry, and much more. Such circuitry can provide the various structures and operations illustrated in FIGS. 2a-6b and FIG. 11. As illustrated by FIG. 9, a hierarchy of module circuitry within the circuitry 910 can be extensive. For example, as depicted, module circuitry, such as the tray module circuitry 920, can include sub-module circuitry, and that sub-module circuitry can each have sub-module circuitry of its own. For example, a majority of the module circuitry of the circuitry 910 (whether or not a sub-module circuitry) can each at least include sub-module circuitry configuring that circuitry and configuring one or more GUIs provided by that circuitry. The example organization of the circuitry of the module circuitry 910 coincides with the arrangement of GUIs and sub-GUIs illustrated in FIGS. 2a-6b. However, other arrangements could coincide with the depicted GUIs as well.

The tray circuitry 920 may include the summary circuitry, the tray configuration circuitry that may include the tray GUI configuration circuitry, and the "more" circuitry associated with the "more" GUI depicted in FIG. 3a, for example. Also, as illustrated in FIG. 9, the tray circuitry 920 includes other sub-circuitry for other functions imaginable by the framework related to a tray object. In FIG. 9, the summary circuitry, such as the respective circuitry providing the summary GUI in FIG. 2b, includes configuration circuitry such as circuitry for the configuration of the summary GUI, analytics circuitry, and monetization circuitry. The analytics circuitry may provide for at least part of the information possibly intended to be viewed by a user and may interact with aspects of an analytics server, such as analytics server 118 to improve feedback and the resulting content at least partially based on the feedback. Several GUIs of the framework may be associated with the analytics circuitry of the summary circuitry or other analytics circuitry of module circuitry 910. Such GUIs are likely to incorporate predictively desired information to audience members of the framework, which can be predicted in part by analytics. The monetization circuitry may be configured to record and communicate the user interaction with an interactive section (such as the entity tray) to sponsor circuitry corresponding to the interactive entity section. The sponsor circuitry depicted in people circuitry 930, places circuitry 932, and things circuitry may be configured to determine and record a fee for the interaction with the interactive entity section. As illustrated in FIG. 9, each sub-circuitry of the module circuitry 910 may include monetization circuitry for monetization of corresponding framework aspects and features. Also, as illustrated in FIG. 9, each individual entity circuitry of the entity circuitry 912 may include its own sponsor circuitry. In an example, the monetization circuitry of the various circuitry of the module circuitry 910 and the sponsor circuitry of individual entity circuitry of the entity circuitry 912 can be tightly coupled to enhance entity sponsorship and monetization processing for aspects and features of the framework selected for sponsorship and monetization.

The entity search result circuitry 922 may provide various functionalities and structures associated with retrieving and displaying sponsored and non-sponsored entity search results, such as the sponsored and non-sponsored entity search results depicted in FIG. 2a. The search suggestion circuitry 924 may provide various functionalities and structures associated with retrieving and displaying sponsored and non-sponsored search suggestions, such as the search suggestions depicted in FIG. 2a. The webpage search result circuitry 926 may provide various functionalities and structures associated with retrieving and displaying webpage search results, such as the sponsored and non-sponsored webpage search results depicted in FIG. 3b. For the purposes of this disclosure, webpage search results are an example of non-entity search results. Other example, non-entity search results are image search results associating images ambiguously with a search query. Entity search results are results that include informational objects for a specific entity, such as a particular person, place, or thing. With places and things, there are sub-entities. Entities will be explained in more detail at another part of this disclosure. The maps circuitry 928 may provide various functionalities and structures associated with retrieving and displaying maps based search results, such as the map search results depicted in FIG. 4b. The maps circuitry 928 may include or be associated with navigation circuitry of the module circuitry 910 (such as circuitry including circuitry for discovering routes and device geographic positioning). The social media circuitry 929 may provide various functionalities and structures, such as GUI elements, associated with presenting social media information and providing social media applications, such as social media widgets. The social media circuitry 929 may be communicatively coupled over a network with servers of social media provides, such as TUMBLR™, LINKEDIN™, GOOGLE PLUS™, FACEBOOK™, TWITTER™, and the like. Information feeds and applications provided by the social media servers can be administrated by the social media circuitry for execution on sponsored and non-sponsored entity trays and GUIs. The social media features as well as any other features described herein may be monetized, and the social media circuitry 929 may include its own circuitry dedicated to monetization. Examples of social media widgets and information are illustrated in FIGS. 2a-6b. See GUI elements 234c-234i and 318c illustrated in FIGS. 2a-6b.

As mentioned, each of the module circuitry may include sub-module circuitry, such as corresponding user interface circuitry, configuration circuitry, analytics circuitry, monetization circuitry, data processing circuitry, data storage circuitry, data retrieval circuitry, navigation circuitry, or any combination thereof. The examples of module circuitry described herein and shown in FIG. 9 are merely illustrative of the expansiveness of the framework.

The entity circuitry 912 include various types of entity circuitry, including people circuitry 930, place circuitry 932, and thing circuitry 934. Individual entity circuitry with the people circuitry 930, place circuitry 932, and thing circuitry 934 can include respective sponsor circuitry, such as depicted in FIG. 9. In an example, control of an online entity module through one of the people circuitry 930, place circuitry 932, and thing circuitry 934, such as a business module or a module for a specific location of that business, can be purchased through sponsorship. In an example, sponsorship can go to the highest bidder. In another example, sponsorship can go to the highest bidder who also has a legitimate claim to that entity module. In yet another example, sponsorship can only be obtained and/or purchased by the actual entity or at least a legal representative of that entity. As it can be imagined, an entity entitled to claim a given online entity module can become complex, so some example implementations can utilize any combination of the aforementioned rules for claiming an entity. For example, in one scenario, only the legal entity Green Can Coffee can purchase sponsorship of the Green Can Coffee the thing entity, but where Green Can Coffee is a franchise, each location of Green Can Coffee may be purchased by its respective franchisee and/or the franchisor Green Can Coffee. The franchisee and franchisor could compete in a bidding process or just work out who is going to pay for the sponsorship themselves. Other complications in claiming an entity may arise. Including entities that are not owned. For example, a historical entity, such as the Holy Roman Empire, does not have an owner, so in some scenarios such an entity may go to the highest bidder. For example, Green Can Coffee may identity that coffee drinkers are interested in European History, so it may be worthwhile for Green Can Coffee to purchase sponsorship of the Holy Roman Empire module. The sponsorship could also be shared with another entity, so that more than one entity can utilized ad time on the Holy Roman Empire module.

In a scenario, the framework service provider of the entity modules may maintain a degree of control over the content presented by an entity module. For example, the provider may regulate the amount of irrelevant content added to a GUI of an entity module. Also, the look and feel of module to some degree may be maintained by the provider to maintain consistency of the look and feel of the environment hosting the entity modules. Also, the provider control can allow for the provider to prevent content from becoming stale. For example, if can entity does not maintain its content regularly, a provider can predict content a user and/or a sponsor wants to be presented by a GUI of an entity module and provide such predicted content instead of the stale content.

Referring back to FIG. 9, the people circuitry 930 includes circuitry for each particular person that can be identified as an entity by the framework. A particular person can be an actual living person or a person who has passed away. Well-known people, who are often searched online, such as celebrities, may be automatically inputted into the framework and hence circuits are generated for those people automatically. Less known people, such as an ordinary Joe starting a small business, may submit an application for circuitry to be generated for themselves or a business and/or product they wish to market through the framework. A particular person can also be a character in a fictional work. For fictional characters, there may be a plurality of entities for a known character. For example, the character Supermom may have entity circuitry for each entered iteration of the Supermom character inputted into the framework, such as a plurality of Supermoms from the different Supermom movies and television series, and a plurality of Supermoms from the different versions of the Supermom comic books. A person entity becomes identifiable when a corresponding entity has been submitted and accepted by the framework. At that point, circuitry can be generated for that person entity. The front end for the modular search framework server 116 and/or the account server 102 can facilitate entry of entities, such as people entities.

The place circuitry 932 includes circuitry for each particular location that can be identified as an entity by the framework. A particular location can be an address, a global positioning point, an actual location not having an address, or combination thereof. Actual locations not having an address can be submitted through an application process, such as an obscure park. Locations that are commonly searched without an address can be automatically inputted into the system as circuits, such as a national park. In other words, well-known places, which are often searched online, such as landmarks, government administrated parks, cities, countries, and even well-known bodies of water, may be automatically inputted into the framework and hence circuits are generated for those places automatically. Less known places, such as an ordinary parking lot without an address, may be submitted via an application for circuitry to be generated for that place. Businesses and products may be marketed through a place entity, for example. Places can be any geographic entity, whether that entity is fictional, non-fictional, still in existence, historical, or some combination thereof. For fictional places, there may be a plurality of entities for a known fictional place. For example, each iteration of Atlantis used in fictional works may have its own entity circuit. A place entity becomes identifiable when a corresponding entity has been submitted and accepted by the framework. At that point, circuitry can be generated for that place entity. A front end for the modular search framework server 116 and/or the account server 102 can facilitate entry of entities, such as place entities.

The thing circuitry 934 includes circuitry for each particular thing that can be identified as an entity by the framework. A particular organization, product, service, named organism (such as a pet or famous circus animal), can be a thing entity. Thing entities can overlap with places entities and fictional character entities; for example, a geographic location like the dark side of the moon may be a thing as well. Also, for example, the Wizard of Oz may be a thing entity (such as a movie entity), and a character entity, such as the Wizard of Oz the character in the original movie production. Also, there may be several iterations of a thing. To continue with the Wizard of Oz theme, there may be several well-known productions of this movie in a live theatre format. Well-known things, which are often searched online, such as movies, mass manufactured products, and large companies, may be automatically inputted into the framework and hence circuits are generated for those things automatically. Less known things, such as a new product developed by an ordinary Joe, may be submitted via an application for circuitry to be generated for that thing. Services and products may be marketed through a thing entity, for example. Things can be almost any unambiguous thing that can be claimed. Things can be fictional, non-fictional, still in existence, historical, or some combination thereof. A thing entity becomes identifiable when a corresponding entity has been submitted and accepted by the framework. At that point, circuitry can be generated for that thing entity. A front end for the modular search framework server 116 and/or the account server 102 can facilitate entry of entities, such as thing entities.

Each particular person, place, or thing circuitry of the entity circuitry 912 can include and provide respective data models for gathering, maintaining, and entering information on that corresponding entity. The data models can include sponsorship and monetization models as well. These data models can also act as an interface for data requested by various operations provided by the module circuitry 910. Each particular entity circuitry may also include logic for facilitating operations between module circuitry of the circuitry 910 and databases storing information on entities. In other words, such entity circuitry may act a middleware between functions and data of the framework. Given this middleware functionality, module circuitry, such as the summary module circuitry, does not need to include sub-circuitry for every entity in the system. When module circuitry is called for an entity, that module circuitry can combine with the entity circuitry via communications instead of actual circuitry per entity hardwired into each module.

Regarding the example entity screen in FIG. 2*b*, various functions are being called which are provided by the module circuitry 910, such as functions of the summary module circuitry. For a function of the summary module circuitry to retrieve information on Green Can Coffee the thing, the function communicates with the particular entity circuitry for Green Can Coffee the thing. This particular entity circuitry may have the information on Green Can Coffee cached or permanently stored within its circuitry or may request the information from a database, such as a database specifically for the modular search framework server 116 (not depicted in FIG. 1) and/or the content database 114 or ad database 110.

Figure 10:
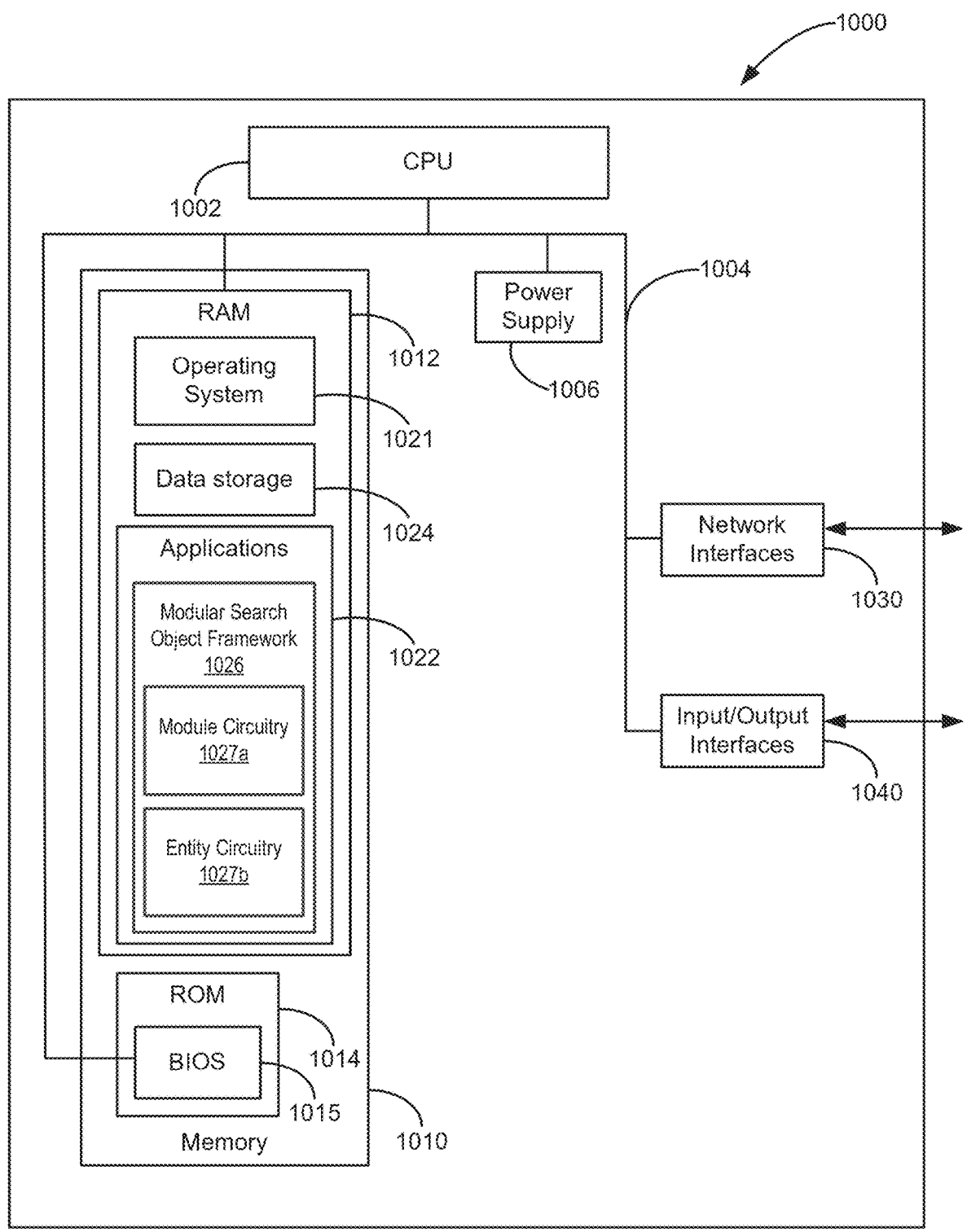

FIG. 10 is a block diagram of an example electronic device 1000 that can implement server-side aspects of and related to example aspects of the framework. For example, the electronic device 1000 can be a device that can implement the modular search framework server 116 of FIG. 1 or the server 900 of FIG. 9. The electronic device 1000 can include a CPU 1002, memory 1010, a power supply 1006, and input/output components, such as network interfaces 1030 and input/output interfaces 1040, and a communication bus 1004 that connects the aforementioned elements of the electronic device. The network interfaces 1030 can include a receiver and a transmitter (or a transceiver), and an antenna for wireless communications. The CPU 1002 can be any type of data processing device, such as a central processing unit (CPU). Also, for example, the CPU 1002 can be central processing logic.

The memory 1010, which can include random access memory (RAM) 1012 or read-only memory (ROM) 1014, can be enabled by memory devices. The RAM 1012 can store data and instructions defining an operating system 1021, data storage 1024, and applications 1022. The applications 1022 can include a modular search object framework 1026 (such as framework circuitry 908 illustrated in FIG. 9), which can include module circuitry 1027*a* (such as module circuitry 910) and entity circuitry 1027*b* (such as entity circuitry 912). The applications 1022 may include hardware (such as circuits and/or microprocessors), firmware, software, or any combination thereof. The ROM 1014 can include basic input/output system (BIOS) 1015 of the electronic device 1000.

The power supply 1006 contains power components, and facilitates supply and management of power to the electronic device 1000. The input/output components can include the interfaces for facilitating communication between any components of the electronic device 1000, components of external devices (such as components of other devices of the information system 100), and end users. For example, such components can include a network card that is an integration of a receiver, a transmitter, and I/O interfaces, such as input/output interfaces 1040. The I/O components, such as I/O interfaces 1040, can include user interfaces such as monitors, keyboards, touchscreens, microphones, and speakers. Further, some of the I/O components, such as I/O interfaces 1040, and the bus 1004 can facilitate communication between components of the electronic device 1000, and can ease processing performed by the CPU 1002.

Figure 11:
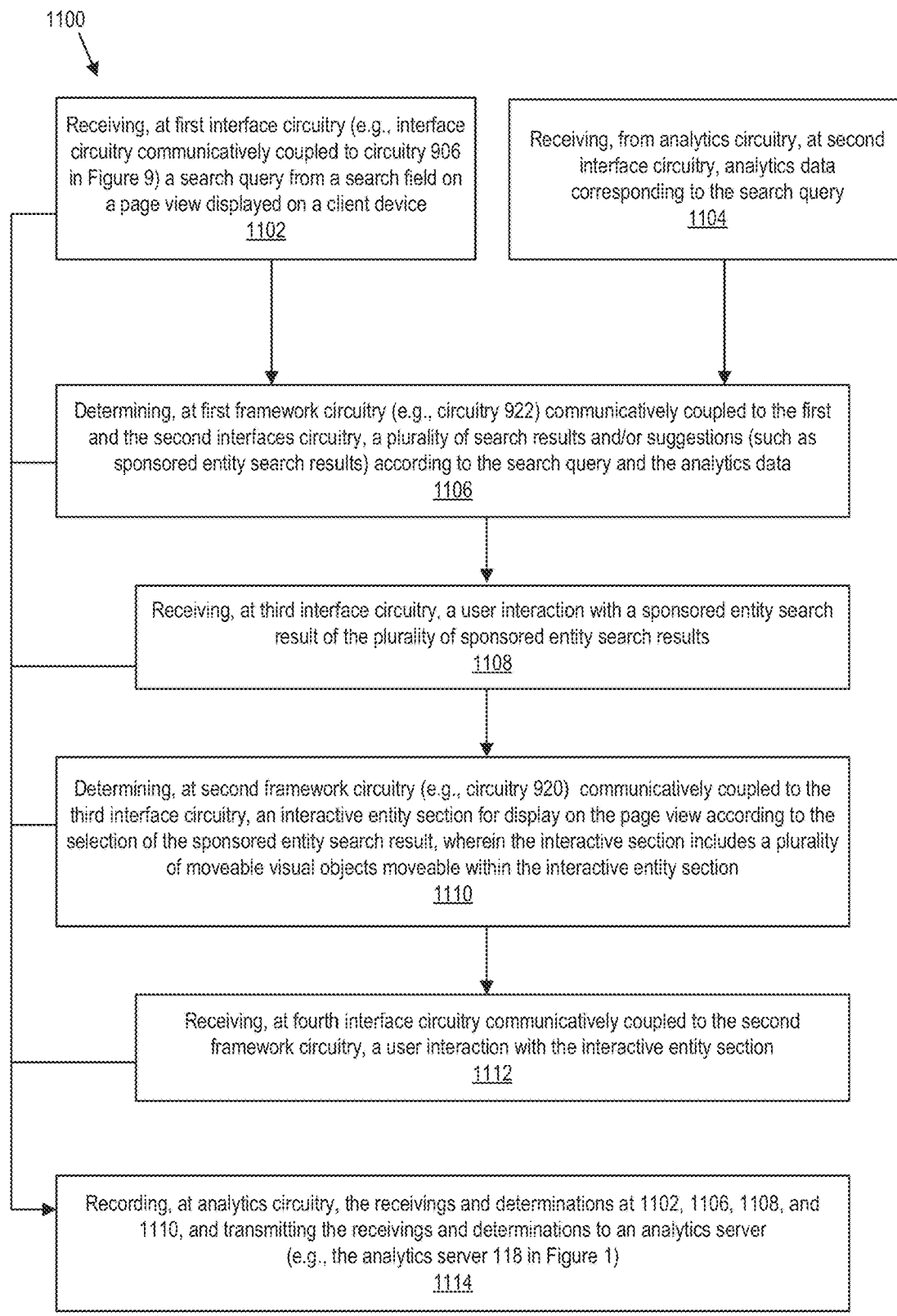
FIG. 11 illustrates example operations of example circuitry of an example system that can provide aspects of the module search object framework. In an example, the operations can be performed by circuitry of a server such as the modular search framework server 116.

FIG. 11 illustrates example operations 1100 of example circuitry of an example system that can provide aspects of the module search object framework. In an example, the operations can be performed by circuitry of a server, such as circuitry in any one or combination of the servers illustrated in FIGS. 1, 9, and 10. The operations 1100 can include receiving, at first interface circuitry (such as the input/output interfaces 1040 in FIG. 10 or interface circuitry communicatively coupled to the network communications circuitry 906 in FIG. 9), a search query from a search field on a page view displayed on a client device (such as any one of the client devices illustrated in FIGS. 1-8), at 1102. The first interface circuitry can also be configured to receive the search query via network communications circuitry (such as the network communications circuitry 906 and the network interfaces 1030) communicatively coupled to the first interface circuitry. The network communications circuitry configured to receive the search query over a network (such as the network 120).

The operations 1100 can also include receiving, at a second interface circuitry communicatively coupled to the first interface circuitry, analytics data corresponding to the search query from analytics circuitry, at 1104. This analytics circuitry may include any one or combination of analytics circuitry embedded in the module search framework server 116, the analytics server 118, and the analytics database 119, and/or the analytics circuitry of the entity search result circuitry illustrated in FIG. 9. The second interface circuitry can be further configured to receive the analytics data via network communications circuitry communicatively coupled to the second interface circuitry. The network communications circuitry can be configured to receive the analytics data over the network.

The operations 1100 can also include determining, at first framework circuitry communicatively coupled to the first interface circuitry and the second interface circuitry, a plurality of sponsored entity search results according to the search query and the analytics data, at 1106. The first framework circuitry can include or be entity search result circuitry (such as the entity search result circuitry 922) configured to further determine the plurality of sponsored entity search results according to entity data. The entity data can include data accessible through any one or more of the people circuitry 930, places circuitry 932, and things circuitry 934 in FIG. 9. The first framework circuitry may be communicatively coupled to such entity circuitry. The entity circuitry including the people, places, and things circuitry may be configured to interface a plurality of sources for the entity data. Also, the entity search result circuitry may include analytics circuitry configured to record and transmit the determination of the plurality of sponsored entity search results to an analytics server for updating the analytics data, at 1114.

The operations 1100 can also include receiving, at third interface circuitry communicatively coupled to the first framework circuitry, a user interaction with a sponsored entity search result of the plurality of sponsored entity search results, at 1108. For example, the user interaction may be a click on the sponsored entity search result. The entity search result circuitry may also include analytics circuitry configured to record and transmit the user interaction with the sponsored entity search result to an analytics server for updating the analytics data, at 1114. The sponsored entity search result circuitry may also include monetization circuitry configured to record and communicate the user interaction with the sponsored entity search result to sponsor circuitry corresponding to the sponsored entity search result (such as one of the sponsor circuitry illustrated in FIG. 9). The sponsor circuitry may be configured to determine and record a fee for the user interaction with the sponsored entity search result.

The operations 1100 can also include determining, at second framework circuitry communicatively coupled to the third interface circuitry, an interactive entity section for display on the page view (such as any one of the entity trays illustrated in FIGS. 2b-6b) according to the selection of the sponsored entity search result, at 1110. The interactive section may include a plurality of moveable visual objects moveable within the interactive entity section (such as the moveable cards and miniature trays within the entity trays depicted in FIGS. 2b-6b). The second framework circuitry may be or include entity tray circuitry (such as tray module circuitry 920) configured to further determine the interactive entity section for display on the page view according to entity circuitry corresponding to the selected sponsored entity search result. For example, the entity tray circuitry and a particular person, place, or thing circuitry may interact to render a sponsored entity tray corresponding to the selected sponsored entity search result. As depicted in FIG. 9, a person, place, or thing circuitry may include sponsor circuitry, and the sponsor circuitry may be configured to add sponsorship and monetization features to entity related GUIs to be displayed within the sponsored entity tray. Also, the entity tray circuitry may include analytics circuitry configured to record and transmit the determination of the interactive entity section to an analytics server for updating to the analytics data, at 1114.

The operations 1100 can also include receiving, at fourth interface circuitry communicatively coupled to the second framework circuitry, a user interaction with the interactive entity section, at 1112. Also, for example, the entity tray circuitry within the second framework circuitry may include analytics circuitry configured to record and transmit the user interaction with the interactive section to an analytics server for updating to the analytics data, at 1114. The entity tray circuitry may also include monetization circuitry (such as the monetization circuitry illustrated in tray circuitry 920 in FIG. 9) configured to record and communicate the user interaction with the interactive section to sponsor circuitry corresponding to the interactive entity section. As mentioned, the sponsor circuitry may be configured to determine and record a fee for the interaction with the interactive entity section.

In an example, the interactive entity section can be or include an entity tray and the moveable visual objects may include an interactive entity sub-section. The interactive entity sub-section may be a summary sub-section (such as the summary card 228a). The second framework circuitry may include summary circuitry (such as the summary circuitry illustrated in FIG. 9) configured to present summary information according to the analytic data, the search query, corresponding entity information, or any combination thereof. The presented summary information may be determined in real time at least in part by entity circuitry corresponding to the interactive entity section. In an example, the summary sub-section may be a first sub-section presented.

Besides the summary sub-section, the interactive entity sub-section may be a details (or "more") sub-section that includes its own plurality of interactive entity sub-sections (such as depicted in FIG. 3a). The second framework circuitry may include details circuitry configured to present details information amongst the plurality of interactive sub-sections, according to the analytic data, the search query, corresponding entity information, or any combination thereof. The presented details information may be determined in real time at least in part by entity circuitry corresponding to the interactive entity section. Also, in an example, the details sub-section may be presented after a user selects a link to the details sub-section on the summary sub-section.

The invention claimed is:

1. A system stored in a non-transitory medium executable by processor circuitry, comprising:
    first interface circuitry configured to receive a search query from a search field on a page view displayed on a display screen of a mobile client device;
    second interface circuitry communicatively coupled to the first interface circuitry, the second interface circuitry configured to receive analytics data about characteristics of an audience including a user of the mobile client device or about advertisements displayed on the display screen of the mobile client device, or about user interactions with advertisements displayed on the display screen of the mobile client device, the analytics data corresponding to the search query;
    first framework circuitry communicatively coupled to the first interface circuitry and the second interface circuitry, the first framework circuitry configured to determine a plurality of sponsored entity search results according to the search query and the analytics data and to display one or more sponsored entity search results of the plurality of sponsored entity search results on the display screen of the mobile client device;
    third interface circuitry communicatively coupled to the first framework circuitry, the third interface circuitry configured to receive a user interaction with a sponsored entity search result of the plurality of one or more sponsored entity search results displayed on the display screen of the mobile client device; and
    second framework circuitry communicatively coupled to the third interface circuitry, the second framework circuitry configured to determine an interactive entity section for display on the page view in response to the user interaction with the sponsored entity search result, wherein the interactive entity section includes a plurality of moveable visual objects moveable within the interactive entity section in response to interactions including the user interaction to expose to user view a moveable visual object of current interest to the user of the mobile client device and to hide from view other moveable visual objects not of current interest to the user of the mobile client device to allow more screen space for viewing of the moveable visual object of current interest to the user.

2. The system of claim 1, wherein the first interface circuitry is further configured to receive the search query via network communications circuitry communicatively coupled to the first interface circuitry, the network communications circuitry configured to receive the search query over a network.

3. The system of claim 1, wherein the second interface circuitry is further configured to receive the analytics data via network communications circuitry communicatively coupled to the second interface circuitry, the network communications circuitry configured to receive the analytics data over a network.

4. The system of claim 1, wherein the first framework circuitry includes entity search result circuitry configured to further determine the plurality of sponsored entity search results according to entity data, and wherein the first framework circuitry is communicatively coupled to entity circuitry that is configured to interface a plurality of sources for the entity data.

5. The system of claim 4, wherein the entity search result circuitry includes analytics circuitry configured to record and communicate the determination of the plurality of sponsored entity search results to an analytics server for updating the analytics data.

6. The system of claim 4, wherein the entity search result circuitry includes analytics circuitry configured to record and communicate the user interaction with the sponsored entity search result to an analytics server for updating the analytics data.

7. The system of claim 4, wherein the entity search result circuitry includes monetization circuitry configured to record and communicate the user interaction with the sponsored entity search result to sponsor circuitry corresponding to the sponsored entity search result, the sponsor circuitry configured to determine and record a fee for the user interaction with the sponsored entity search result.

8. The system of claim 1, wherein the user interaction with the sponsored entity search result comprises a selection of the sponsored entity search result of the one or more sponsored entity search results, and wherein the second framework circuitry comprises entity tray circuitry configured to further determine the interactive entity section for display on the page view according to entity circuitry corresponding to the selection of the sponsored entity search result.

9. The system of claim 8, wherein the entity tray circuitry includes analytics circuitry configured to record and communicate the determination of the interactive entity section to an analytics server for updating the analytics data.

10. The system of claim 8, wherein the entity tray circuitry is further configured to receive a user interaction with the interactive entity section and wherein the entity tray circuitry includes analytics circuitry configured to record and communicate the user interaction with the interactive entity section to an analytics server for updating the analytics data.

11. The system of claim 8, wherein the entity tray circuitry is further configured to receive a user interaction with the interactive entity section and wherein the entity tray circuitry includes monetization circuitry configured to record and communicate the user interaction with the interactive entity section to sponsor circuitry corresponding to the interactive entity section, the sponsor circuitry configured to determine and record a fee for the user interaction with the interactive entity section.

12. The system of claim 1, wherein the interactive entity section comprises an entity tray and the plurality of moveable visual objects include an interactive entity sub-section.

13. The system of claim 12, wherein the interactive entity sub-section is a summary sub-section and wherein the second framework circuitry includes summary circuitry configured to present summary information according to the analytics data, the search query, and corresponding entity information.

14. The system of claim 13, wherein the presented summary information is determined in real time at least in part by entity circuitry corresponding to the interactive entity section.

15. The system of claim 12, wherein the interactive entity sub-section comprises a details sub-section that includes its own plurality of interactive entity sub-sections and wherein the second framework circuitry includes details circuitry configured to present details information amongst the plurality of interactive entity sub-sections, according to the analytics data, the search query, and corresponding entity information.

16. The system of claim 15, wherein the presented details information is determined in real time at least in part by entity circuitry corresponding to the interactive entity section.

17. The system of claim 15, wherein the details sub-section is presented after the user selects a link to the details sub-section on a summary sub-section, and wherein the summary sub-section is another interactive entity sub-section and the second framework circuitry includes summary circuitry configured to present summary information according to the analytics data, the search query, and the corresponding entity information.

18. The system of claim 1,
wherein the first framework circuitry is configured to determine the interactive entity section including a plurality of moveable cards displayed in overlapping relation to each other, each respective moveable card corresponding to at least one sponsored entity search result of the one or more sponsored entity search results, each respective moveable card being moveable on the display screen of the mobile client device in response to the user interactions; and
wherein the second framework circuitry is configured to display a selected moveable card of the plurality of moveable cards as overlapping other moveable cards of the plurality of moveable cards so as to allow more screen space for viewing the selected moveable card.

19. A method, comprising:
receiving, at circuitry, a search query, analytics data about characteristics of an audience including a user of a mobile client device or advertisements for display on the mobile client device or user interactions with advertisements displayed on the mobile client device, the analytics data corresponding to the search query, and entity data corresponding to the search query;
determining, by the circuitry, a plurality of sponsored entity search results according to the search query, the analytics data, and the entity data; and
outputting, by the circuitry, the plurality of sponsored entity search results for presentation on a touchscreen of the mobile client device within a list along with non-sponsored entity search results, the plurality of sponsored entity search results and the non-sponsored entity search results being moveable about the touchscreen of the mobile client device in response to tactile gestures made on the touchscreen on or proximate to the plurality of sponsored entity search results and the non-sponsored entity search results to expose to user view a moveable visual object of current interest to the user of the mobile client device and to hide from view other moveable visual objects not of current interest to the user of the mobile client device to allow more screen space on the touchscreen for viewing of the moveable visual object of current interest to the user.

20. The method of claim 19, further comprising moving, in response to tactile gestures, at least one result of the plurality of sponsored entity search results by expanding the at least one result, collapsing the at least one result, minimizing the at least one result, shuffling the at least one result, flipping the at least one result, swiping around the at least one result, or any combination thereof.

* * * * *